(12) United States Patent
Ikeda et al.

(10) Patent No.: US 7,609,947 B2
(45) Date of Patent: Oct. 27, 2009

(54) METHOD AND APPARATUS FOR COORDINATING PLAYBACK FROM MULTIPLE VIDEO SOURCES

(75) Inventors: Wataru Ikeda, Osaka (JP); Tomoyuki Okada, Nara (JP); Keiichi Tanaka, Kawanishi (JP); Masahiro Oashi, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 789 days.

(21) Appl. No.: 11/216,409

(22) Filed: Aug. 31, 2005

(65) Prior Publication Data
US 2008/0031599 A1 Feb. 7, 2008

(30) Foreign Application Priority Data
Sep. 10, 2004 (JP) ............................. 2004-263628

(51) Int. Cl.
*H04N 5/00* (2006.01)
*H04N 5/91* (2006.01)

(52) U.S. Cl. .......................................... 386/126; 386/46
(58) Field of Classification Search .................. None
See application file for complete search history.

(56) References Cited
U.S. PATENT DOCUMENTS

| | | | |
|---|---|---|---|
| 6,112,009 A | 8/2000 | Kikuchi et al. | |
| 6,134,383 A | 10/2000 | Kikuchi et al. | |
| 6,363,204 B1* | 3/2002 | Johnson et al. | 386/46 |
| 6,456,777 B1* | 9/2002 | Masuno et al. | 386/46 |
| 2002/0090206 A1 | 7/2002 | Kikuchi et al. | |
| 2002/0191963 A1 | 12/2002 | Kikuchi et al. | |
| 2003/0002858 A1 | 1/2003 | Kikuchi et al. | |
| 2006/0098936 A1* | 5/2006 | Ikeda et al. | 386/46 |

FOREIGN PATENT DOCUMENTS

| | | | |
|---|---|---|---|
| JP | 08-191423 | | 7/1996 |
| JP | 11-075159 | | 3/1999 |
| JP | 2002247526 A | * | 8/2002 |
| JP | 2003-068057 | | 3/2003 |

* cited by examiner

*Primary Examiner*—Thai Tran
*Assistant Examiner*—Heather R Jones

(57) ABSTRACT

A playback apparatus performs multiangle playback by selectively playing back a plurality of video streams stored on a BD-ROM and a hard disk. In response to a user operation requesting an angle change, the playback apparatus reads a video stream corresponding to the requested angle either from the BD-ROM or the hard disk. During playback of a video stream stored on the hard disk, a drive device of the optical disc is controlled so that the optical pickup always points to an area of the BD-ROM where a video stream is stored.

6 Claims, 18 Drawing Sheets

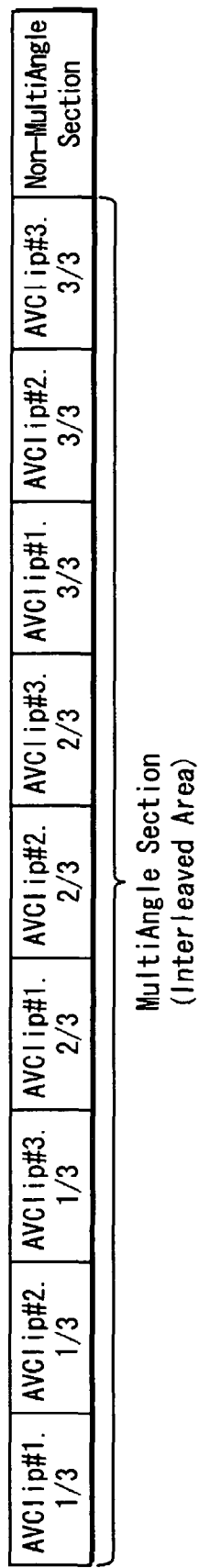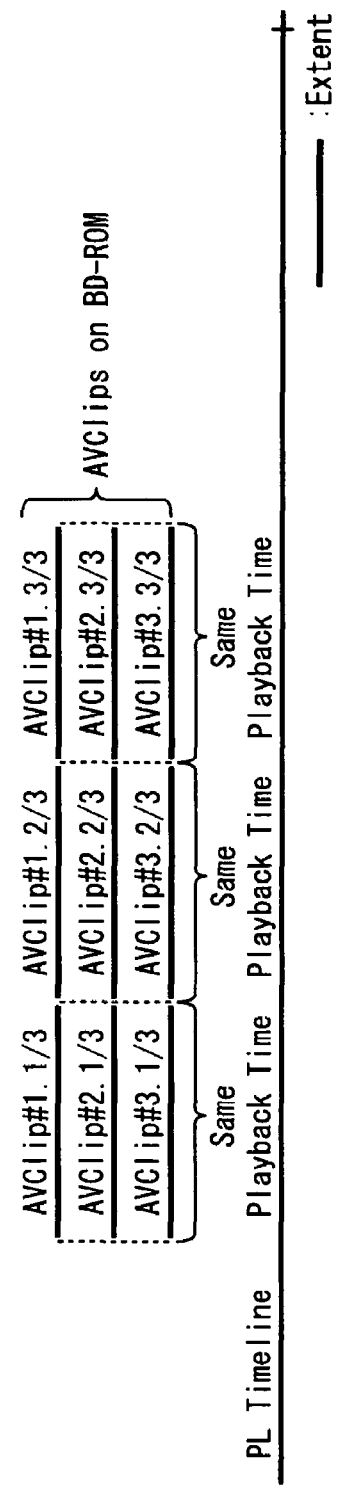

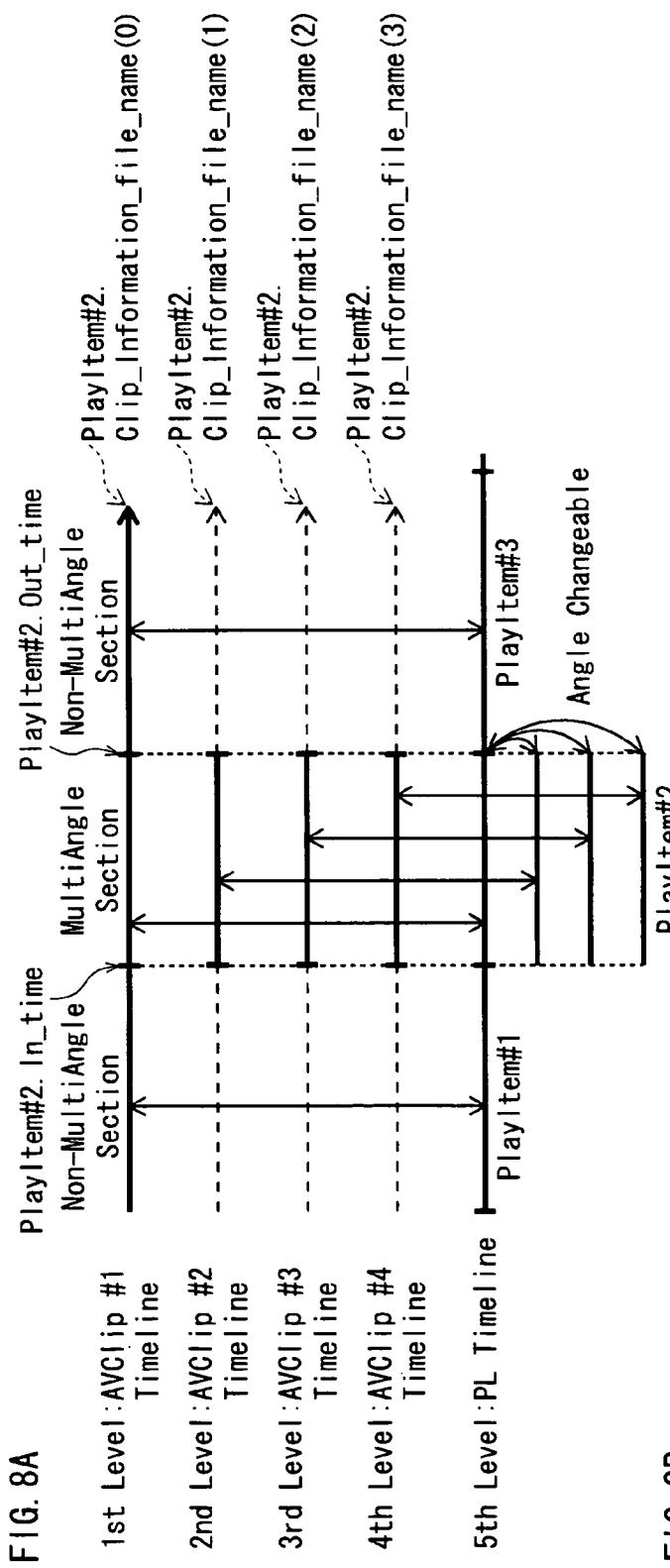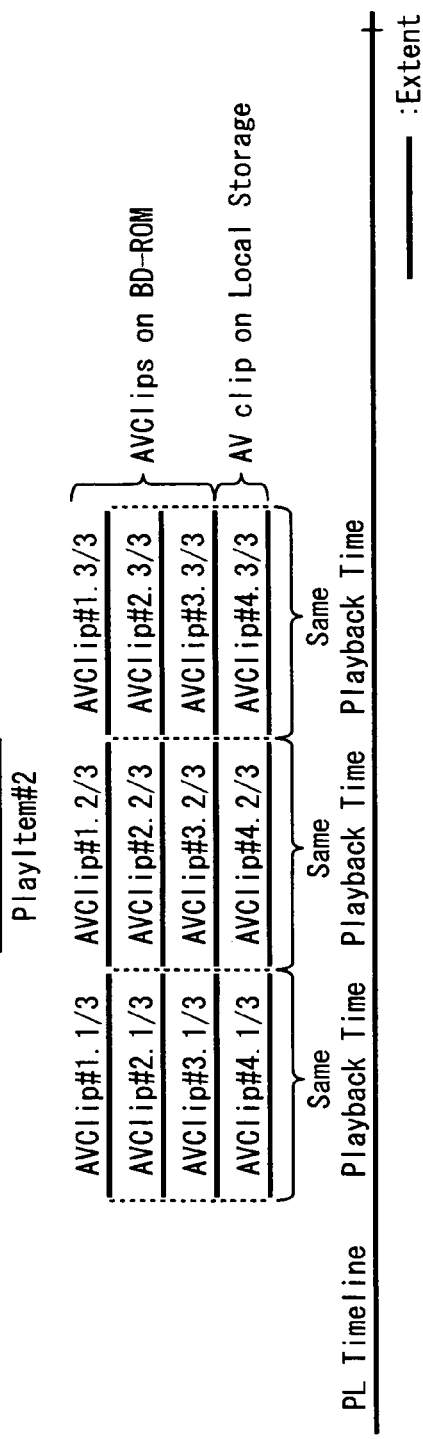
FIG. 8A
FIG. 8B

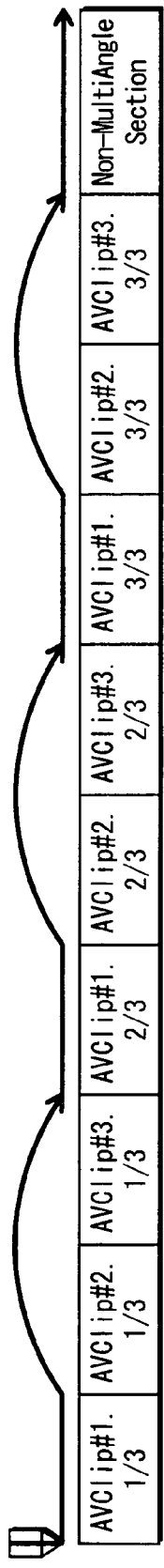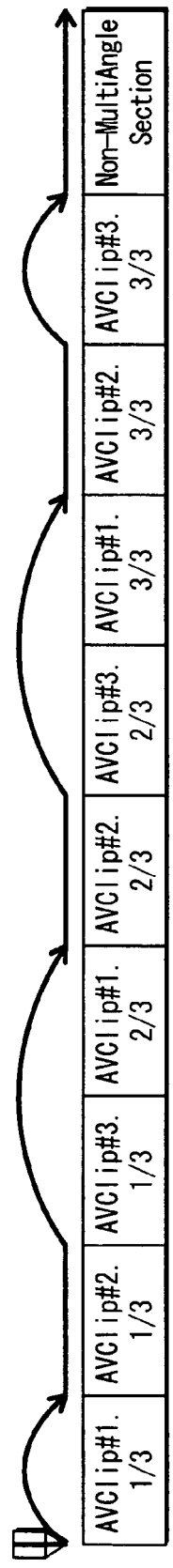

FIG. 12A Change Angle A → Angle B
1st Level: AVClip Allocation on BD-ROM
2nd Level: AVClip Allocation on Local Storage
FIG. 12B Change Angle A → Angle C
1st Level: AVClip Allocation on BD-ROM
2nd Level: AVClip Allocation on Local Storage

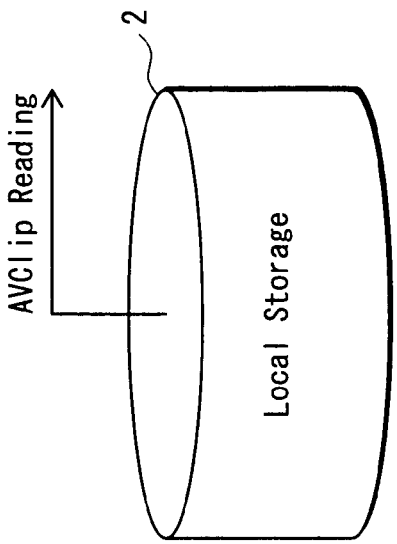

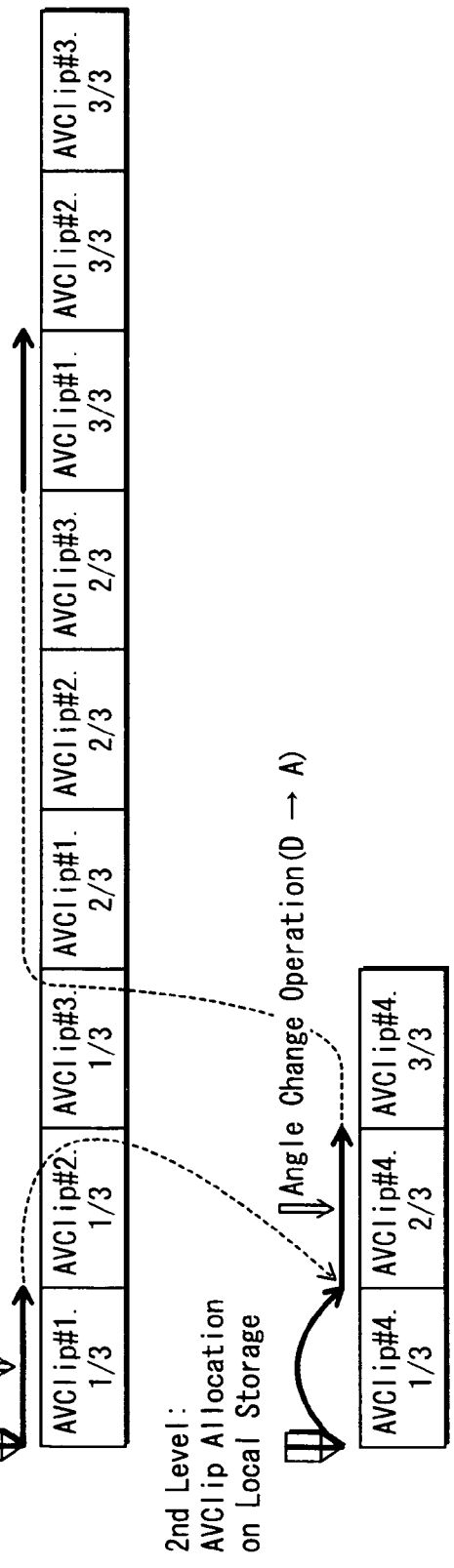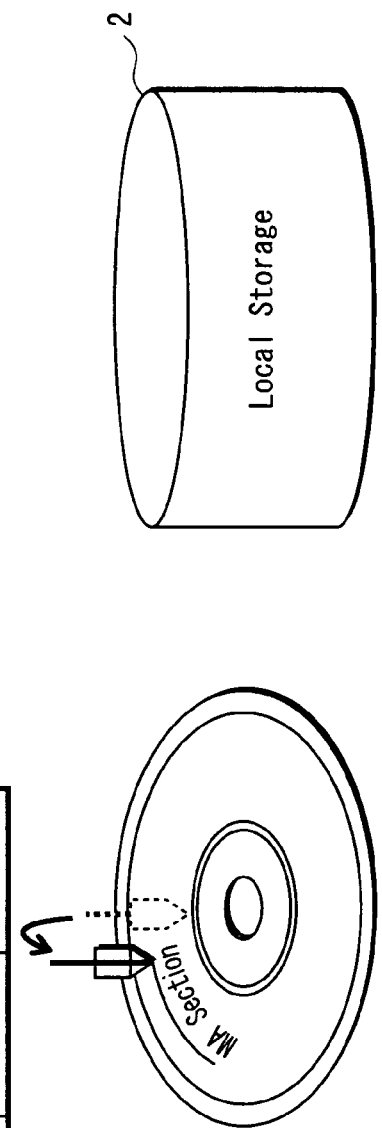
FIG. 14A Change Angle A → Angle D → Angle A
FIG. 14B

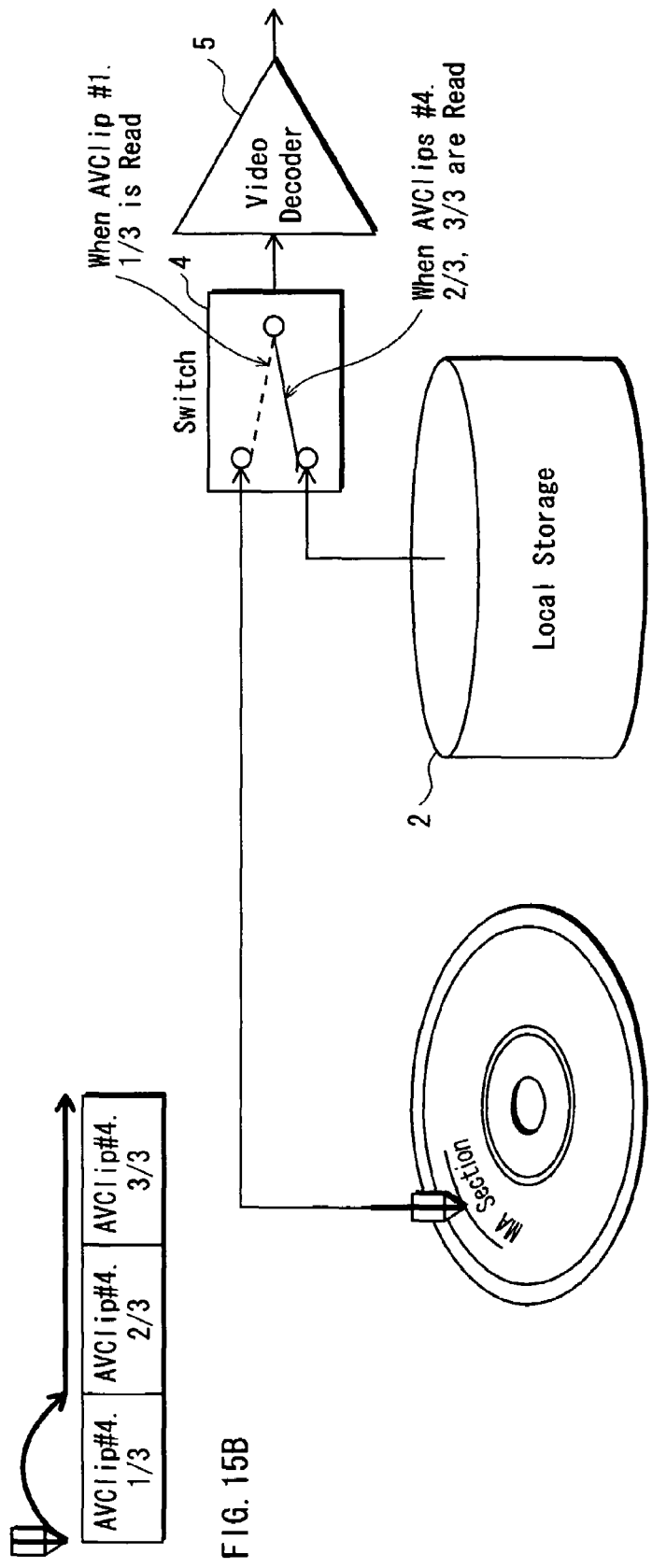

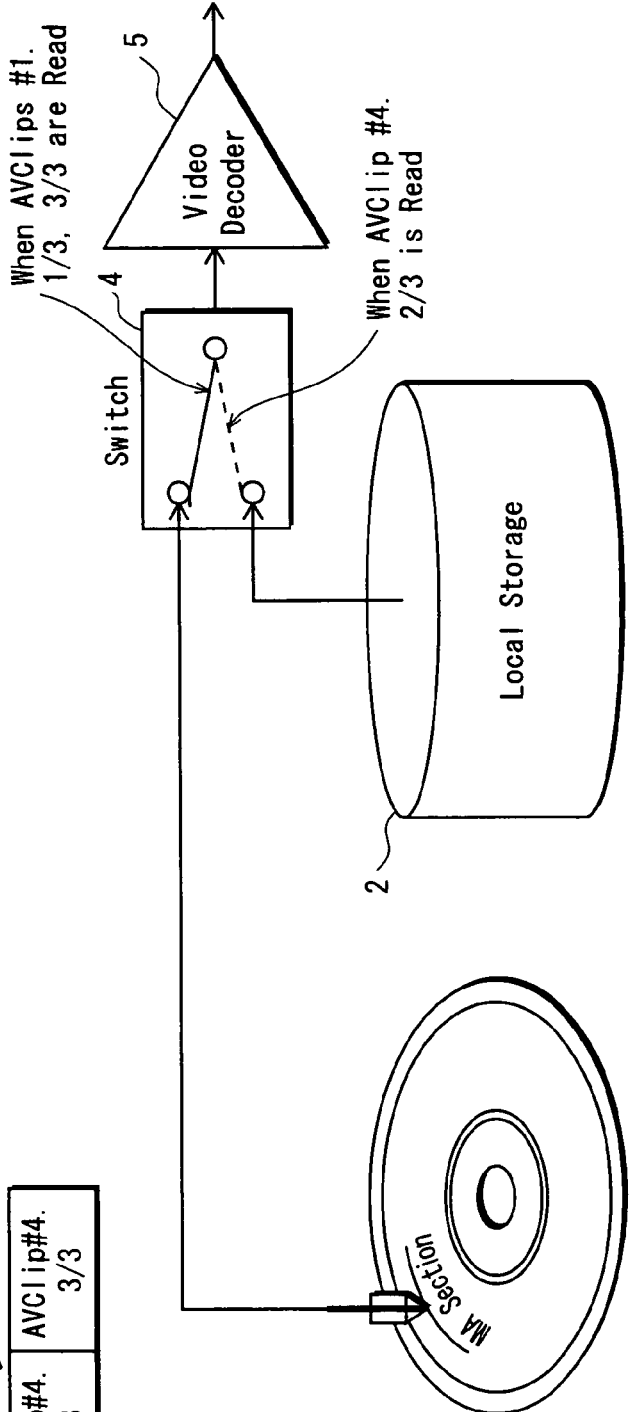

METHOD AND APPARATUS FOR COORDINATING PLAYBACK FROM MULTIPLE VIDEO SOURCES

BACKGROUND OF THE INVENTION (1) Field of the Invention

The present invention relates to a technique of multiangle playback.

(2) Description of the Related Art

Multiangle playback is a technique of selectively reading a plurality of video streams stored on a recording medium to switch playback of video images. The plurality of video streams contains video images of the same subject shot from different camera angles, for example, from the front, right, and left. Multiangle playback of the video streams allows users to switch video playback as if the camera angle is changed from the front to the right and from the right to left, for example.

SUMMARY OF THE INVENTION

In order to implement angle change, it is conventionally common that a plurality of video streams is stored on a single recording medium, which generally is an optical disc. Now, there is a demand for more advanced angle changes freely between video streams stored on an optical disk and on a hard disk.

Unfortunately, however, an angle change between different recording media gives a rise to the following problem. Suppose one of a plurality of drive devices for accessing a different one of the recording media reads a video stream. During the time the video stream is being read, another drive device stands idle. Once an optical disc drive device is put to an idle state, it takes a while to resume reading, which causes an interruption to the video playback.

More specifically, when put to an idle state, the optical disc drive device retracts its optical pickup into the lead-in area located on the innermost track of the optical disc. When a user selects a video stream stored on the optical disc, the optical pickup needs to be moved from the innermost track to the area where the video stream is stored. This movement involves a seek operation and focus adjustment of the optical pickup. Thus, it takes a certain amount of time for the optical pickup to reach the video stream on the optical disk. During the time the optical pickup is on the move, no data is supplied to the decoder. As a result, video playback is interrupted.

Generally, it is often the case where a video stream stored on an optical disc is a main feature, whereas a video stream stored on a hard disk is an additional feature that is later downloaded. With this being the case, playback of the video stream stored on the hard disk is almost always followed by playback of the video stream stored on the optical disc. If video playback is interrupted every time playback of the main feature is resumed, it is annoying not only to users watching the video playback but also to the film makers who provide the video contents. Manufacturers of such playback apparatuses may have to be placed in an awkward situation earning unpopularity among the end users and also among the film makers.

The present invention aims to provide a playback apparatus capable of performing smooth angle changes, so that the users are never forced to recognize that video streams are stored on a plurality of different recording media.

The above aim is achieved by a playback apparatus for selectively playing back a plurality of digital streams stored on a plurality of recording media. The playback apparatus includes: a plurality of drive devices each operable to access a different one of the recording media; a selecting unit operable to select one of the digital streams in accordance with a user operation or a state of the playback apparatus; a control unit operable to control the drive devices, so that the selected digital stream is read from one of the recording media; and a playback unit operable to play the read digital stream. One of the recording media is an optical disc, and another of the recording media is a secondary medium used as an additional medium to the optical disc. During playback of a digital stream stored on the secondary medium, the control unit causes an optical pickup of an optical disc drive device to point to an area on the optical disc where the digital stream is stored.

Throughout the time the secondary medium is being read, the drive device is controlled so that the optical pickup always points to the area of the optical disc where the video stream is stored. With this arrangement, playback of the video stream stored on the optical disc is resumed without causing interruption to video playback. Thus, multiangle playback is performed smoothly in a manner that the users are never forced to be aware of the different physical storage locations of the video streams.

That is, it is made possible to perform smooth multiangle playback of a plurality of video streams, even if one of the video streams is supplied in form of an optical disc and another of the video streams is supplied by downloading via a network. This paves the way for a new distribution pattern in which a video stream of a main feature is provided on an optical disc and an additional video stream for multiangle playback is supplied by downloading.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3A is an allocation image showing how three AV Clips composing a multiangle section are allocated on the BD-ROM, and FIG. 3B shows extents composing each AV Clip on the timeline of the AV Clip;

FIG. 8A shows the collective specification of playback sections by four "Clip_Information_file_name" fields contained in PlayItem Information, and FIG. 8B shows extents of respective AV Clips on a PL timeline;

FIG. 11A schematically shows the reading operation in the case where AVClip #1 on the BD-ROM is selected from among four angles, and FIG. 11B schematically shows the reading operation in the case where AVClip #2 on the BD-ROM is selected from among four angles;

FIG. 12A schematically shows the reading operation in the case where AVClip #2 is selected during the playback of AVClip #1, and FIG. 12B schematically shows the reading operation when AVClip #3 is selected during the playback of AVClip #1;

FIG. 13A schematically shows the reading operation performed when an angle change from AVClip #1 to AVClip #4 is initiated during the playback of AVClip #1.1/3, and FIG. 13B schematically shows the movement of the optical pickup when retracted into the innermost track of the BD-ROM;

FIG. 14A schematically shows an example in which-AV Clip #1 is selected again and to resume playback, and FIG. 14B schematically shows the movement of the optical pickup from the lead-in area;

FIG. 15A schematically shows the tracking control performed by a control unit 11 in response to a user operation to change Angle A to Angle D, and FIG. 15B schematically shows the setting of the switch 4 at the time of the read operation shown in FIG. 15A;

FIG. 16A schematically shows the tracking control of the optical pickup in the case where Angle A→Angle D→Angle A are sequentially selected, and FIG. 16B schematically shows the setting of the switch 4 at the time of the read operation shown in FIG. 16A;

DESCRIPTION OF THE PREFERRED EMBODIMENT

Figure 1:
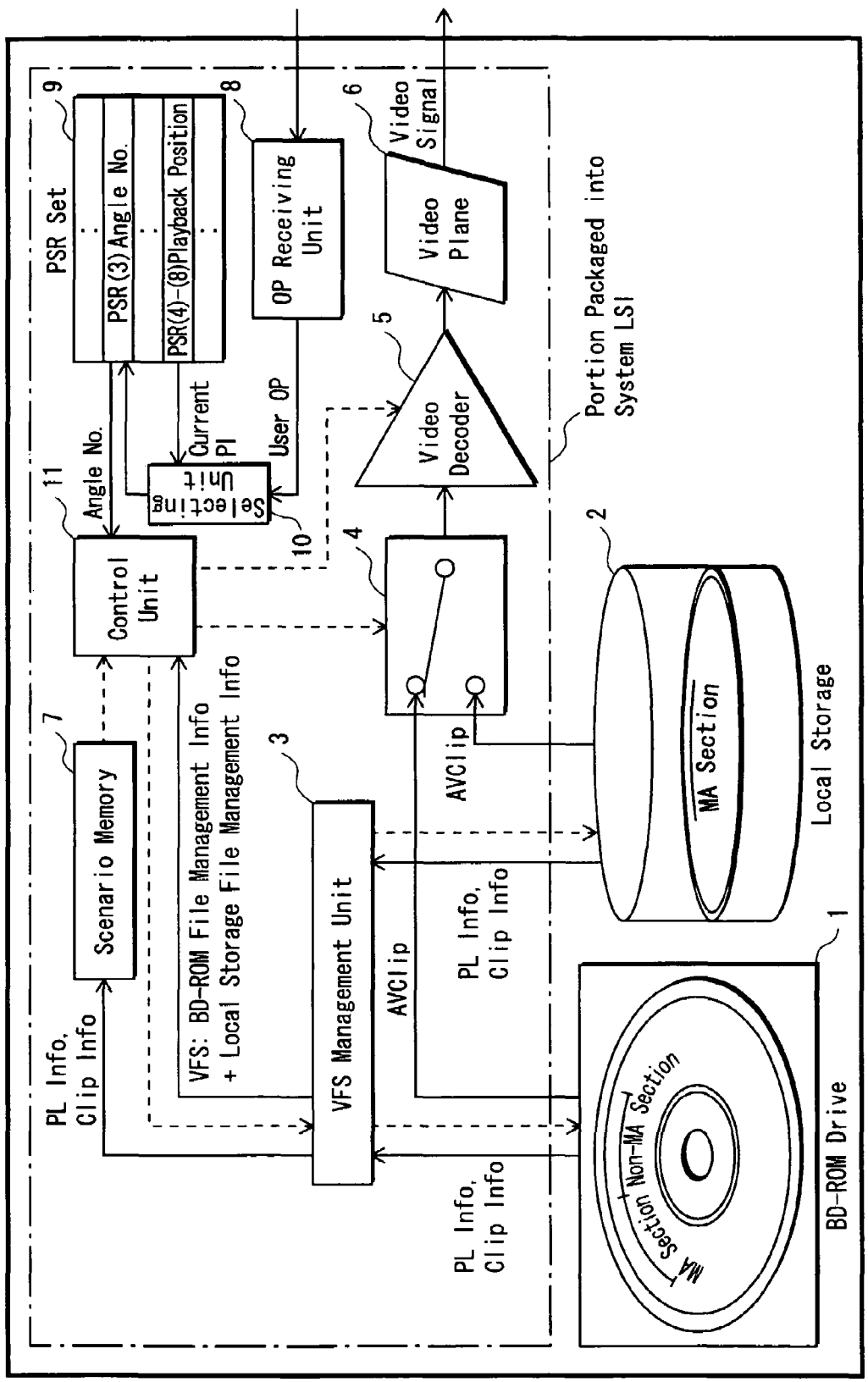
FIG. 1 shows the internal structure of a playback apparatus according to the present invention.

Hereinafter, an explanation is given to the internal structure of a playback apparatus according to the present invention. FIG. 1 shows the internal structure of the playback apparatus. As shown in the figure, the playback apparatus is composed of a BD-ROM drive 1, a local storage 2, a Virtual File System management unit 3 (hereinafter, "VFS management unit 3"), a switch 4, a video decoder 5, a video plane 6, a scenario memory 7, an operation receiving unit 8, a PSR set 9, a selecting unit 10, and a control unit 11. Among those components, the VFS management unit 3, the switch 4, the video decoder 5, the video plane 6, the scenario memory 7, the operation receiving unit 8, the PSR set 9, the selecting unit 10, and the control unit 11 may be built into one system LSI.

<BD-ROM Drive 1>

The BD-ROM drive 1 is a drive device of a BD-ROM. The BD-ROM drive 1 sequentially reads an AV Clip part by part from the BD-ROM and outputs to the switch 4. Note that the BD-ROM is a recording medium storing a plurality of AV Clips each with a corresponding piece of Clip information.

Figure 2:
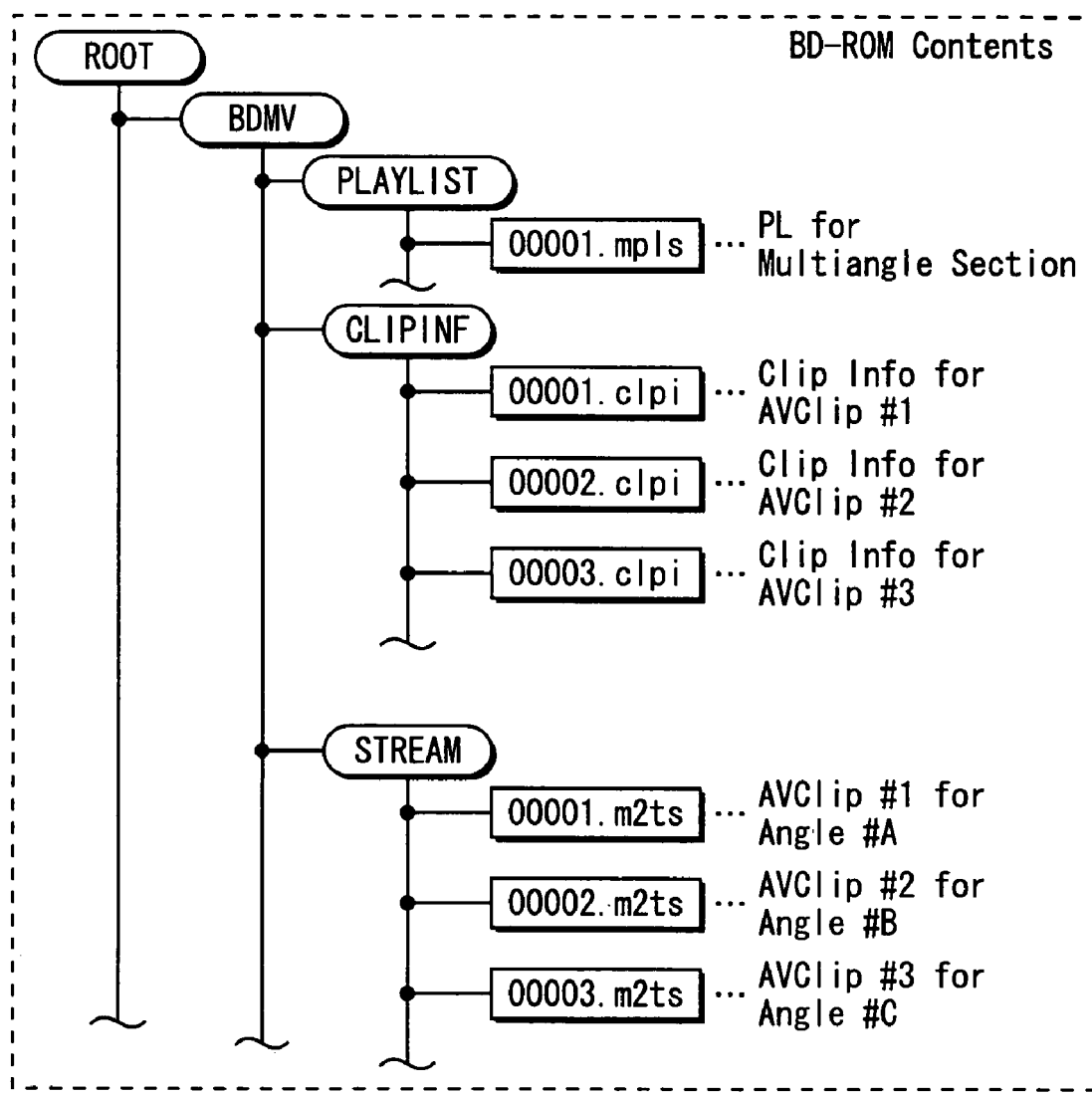
FIG. 2 shows the application layer format (application format) of a BD-ROM.

Now, the BD-ROM will be further explained. FIG. 2 shows the application layer format (application format) of the BD-ROM. As shown in the figure, the BD-ROM has a BDMV directory below a Root directory. The BDMV directory contains subdirectories called a PLAYLIST directory, a CLIP-INF directory, and STREAM directory.

<BD-ROM Structure—Part 1: AV Clip>

In FIG. 2, each file with an extension ".m2ts" (such as "00001.m2ts", "00002.m2ts", and "00003.m2ts" . . . ) contains an AV Clip which is a digital stream into which video and audio streams are multiplexed.

<BD-ROM Structure—Part 2: AV Clip Storage>

Now, an explanation is given to how each AV Clip is divided and stored on the BD-ROM. Each AV Clip is stored on the BD-ROM in a plurality of extents. An extent, also referred to as a "segment", is a contiguous area of the BD-ROM used to store data.

AVClips #1-#3 shown in FIG. 2 are video images taken from three different angles. Each of the AVClips #1-#3 is divided into three extents as follows.

AVClip #1 →
AVClip #1.1/3, AVClip #1.2/3, and AVClip #1.3/3
AVClip #2 →
AVClip #2.1/3, AVClip #2.2/3, and AVClip #2.3/3
AVClip #3 →
AVClip #3.1/3, AVClip #3.2/3, and AVClip #3.3/3

FIG. 3B shows the extents of each AV Clip on the timeline of the AV Clip. The three extents of each AV Clip are located at the same positions on the playback timeline with the counterpart extents of the other AV Clips. More specifically, AVClip #1.1/3, AVClip #2.1/3, and AVClip #3.1/3 are all located at the same position on the timeline. Similarly, AVClip #1.2/3, AVClip #2.2/3, and AVClip #3.2/3 are all located at the same position on the timeline, and AVClip #1.3/3, AVClip #2.3/3, and AVClip #3.3/3 are all located at the same position on the timeline.

The extents of the three AV Clips are recorded onto the BD-ROM by interleaving. Interleaving is a process of recording multiple files, according to which each file is divided into a plurality of extents and extents with the same playback timing out of the all the extents are collectively recorded. In this embodiment, each of the three AV Clips is composed of three extents. Thus, by interleaving the AV Clips, the first extents of the respective AV Clips (AVClip #1.1/3, AVClip #2.1/3, and AVClip #3.1/3) are recorded in one group. Similarly, the second extents of the respective AV Clips (AVClip #1.2/3, AVClip #2.2/3, and AVClip #3.2/3) are recorded in one group, and the third extents of the respective AV Clips (AVClip #1.3/3, AVClip #2.3/3, and AVClip #3.3/3) are recorded in one group.

Among these extents, AVClip #1.1/3, AVClip #2.1/3, and AVClip #3.1/3 are parts of the respective AV Clips located at the same position on the playback timeline. As described above, extents with the same playback timing are grouped together and recorded consecutively on the BD-ROM. FIG. 3A is an allocation image showing how the three AV Clips composing a multiangle section are allocated on the BD-ROM.

Owing to the interleaving, it is ensured that upon suspending a read operation of one file, a read operation of another file is ensured to be immediately started, whereby the currently read file is appropriately switched to another. Note that the area of the BD-ROM in which the multiple AV Clips are interleaved is referred to as an "interleaved area". Further, the section in which the multiple AV Clips are interleaved and thus any of the multiple AV Clips is freely selectable is referred to as a "multiangle section", whereas a section in which one AV Clip is stored without interleaving is referred to as a "non-multiangle section". (In the figures, the multiangle section may be referred to as an "MA section"). On the BD-ROM, the AV Clips composing the multiangle section is followed by an AV Clip composing a non-multiangle section, and the AV Clip composing the non-multiangle section is played back continuously to a selected one of the AV Clips composing the multiangle section. This concludes the explanation of the interleaving of AV Clips on the BD-ROM. Hereinafter, the video images presented by AV Clip #1, AVClip #2, and AVClip #3 stored on the BD-ROM are referred to as "Angle A", "Angle B", and "Angle C", respectively.

<BD-ROM Structure—Part 3: Clip Information>

Files with extensions "clpi" (such as "00001.clpi", "00002.clpi", "00003.clpi" . . . ) correspond one-to-one with AV Clips and each contain management information of a corresponding AV Clip. Being management information, Clip information contains information indicating the coding format, the frame rate, the bit rate, the resolution information of a corresponding AV Clip stream, and also contains an EP_map indicating the entry points of GOPs.

Figure 4:
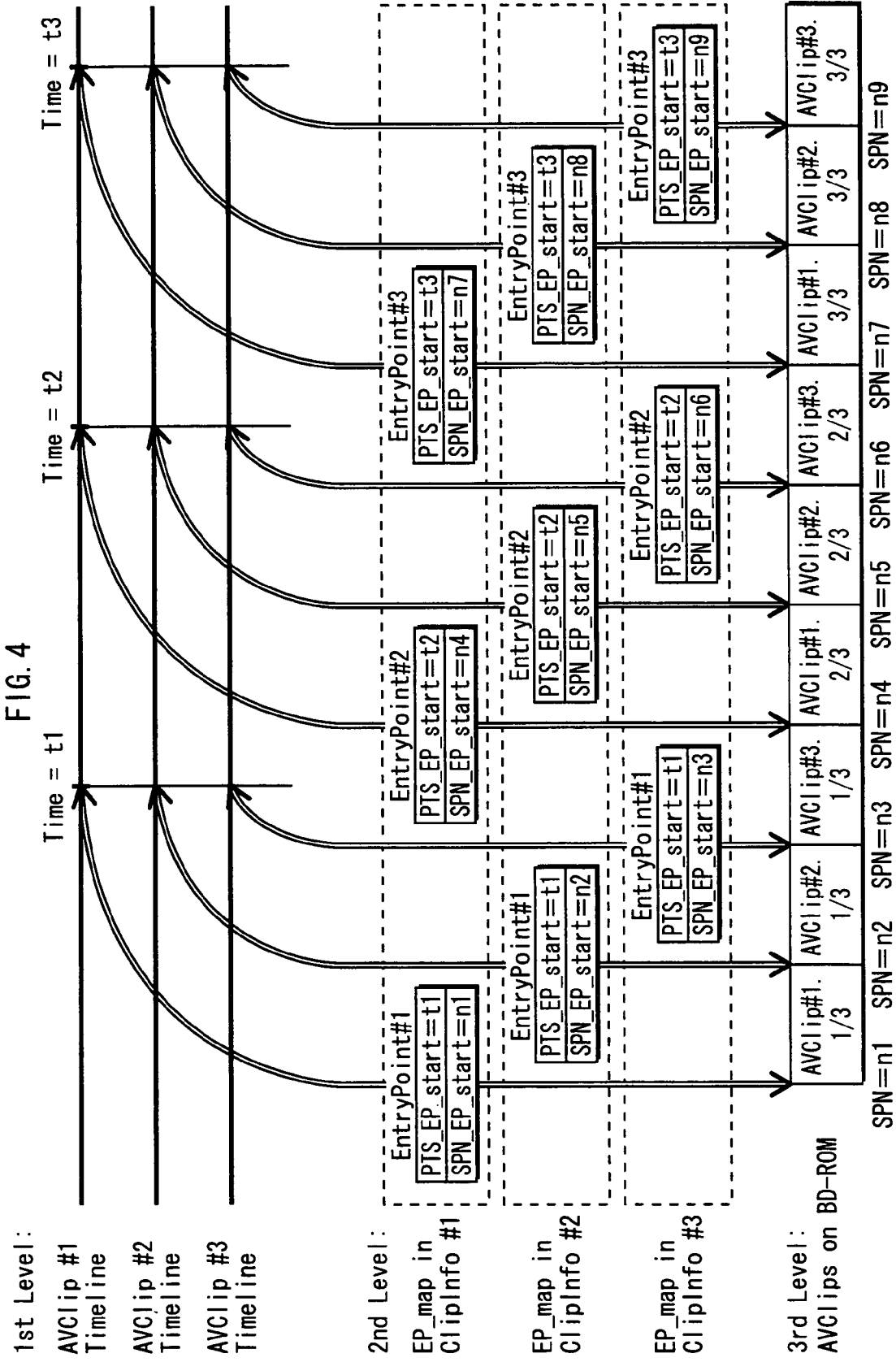
FIG. 4 shows the data structures of EP_map contained in Clip information.

FIG. 4 shows the data structures of EP_maps contained in the respective pieces of Clip information. The $1^{st}$ level of the figure shows the timelines of AVClip #1, AVClip #2, and AVClip #3. The $2^{nd}$ level shows the three EP_maps contained in ClipInfo #1, ClipInfo #2, and ClipInfo #3. The $3^{rd}$ level shows the multiangle section (the AV Clips composing the interleaved area) on the BD-ROM.

As shown on the $3^{rd}$ level, the AV Clip extents, namely AVClip #1.1/3-AVClip #1.3/3, AVClip #2.1/3-AVClip #2.3/3, and AVClip #3.1/3-AVClip #3.3/3 start with the packets bearing the packet numbers SPN of n1-n9. As shown on the $1^{st}$ level, the playback start times of AVClip #1.1/3-AVClip #3.1/3, AVClip #1.2/3-AVClip #3.2/3, and AVClip #1.3/3-AVClip #3.3/3 are t1, t2, and t3, respectively. The EP_map contained in ClipInfo #1 indicates the respective playback times t1, t2, and t3 on the timeline of AVClip #1 together with SPNs n1, n4, and n7, which are the numbers of the first packets of AVClip #1.1/3-AVClip #1.3/3. Similarly, the EP_map contained in the ClipInfo #2 indicates the playback times t1, t2, and t3 on the timeline of AVClip #2 together with SPNs n2, n5, and n8, which are the numbers of the first packets of the AVClip #2.1/3-AVClip #2.3/3. Similarly, the EP_map contained in the ClipInfo #3 indicates the playback times t1, t2, and t3 on the timeline of AVClip #3 together with SPNs n3, n6, and n9, which are the numbers of the first packets of the AVClip #3.1/3-AVClip #3.3/3.

As described above, the EP_map contained in each piece of Clip information associates the first SPN of each extent with a specific playback time on the timeline. Thus, EP_maps make it possible to specify an SPN corresponding to any playback position in the AV Clips. Although not illustrated in the figure for the simplicity sake, each extent contains at least one GOP. Each EP_map indicates, in pairs, SPN and PTS of the first picture data in each GOP contained in the extents. Since GOPs are located at intervals of 0.4-1.0 sec, the EP_map indicates the pairs of SPN and PTS of picture data located at intervals of 0.4-1.0 sec. With the use of the EP_maps, the playback apparatus is allowed to access an arbitrary position on the AV Clips composing the multiangle section.

Note that no explanation is given to files with extensions "mpls" (such as "00001.mpls", "00002.mpls", and "00003.mpls")

<Local Storage 2>

The local storage 2 is a secondary recording medium used as an additional storage medium to the BD-ROM. The local storage 2 is used for storing contents distributed from a server run by a film provider. The local storage 2 used in this embodiment is a hard disk provided within the playback apparatus and stores an AV Clip, Clip information, and PlayList information distributed via the film provider server. In response to a request from the control unit 11, the local storage 2 sequentially reads the AV Clip part by part from the hard disk and outputs to the switch 4.

<Local Storage Structure—Part 1: Directory Structure>

Figure 5:
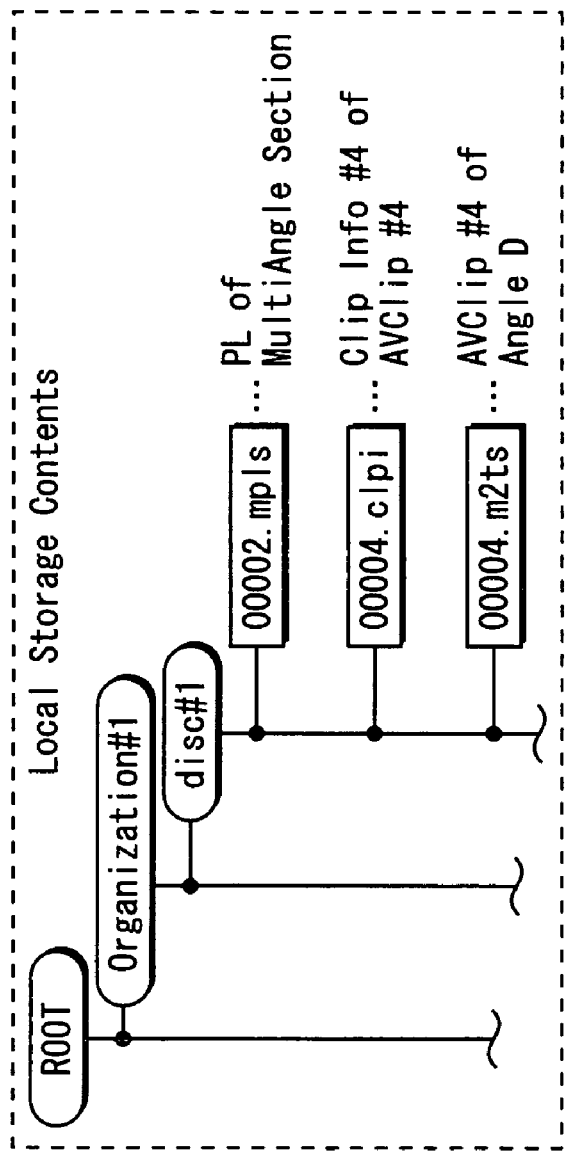
FIG. 5A shows the directory structure employed by a local storage 2.
FIG. 5B shows an AV Clip stored on the local storage 2.

FIG. 5A shows the directory structure employed by the local storage 2. As shown in the figure, the local storage 2 has a subdirectory called "organization #1" below a ROOT directory, and another subdirectory called "disc #1" below the "organization #1" subdirectory. The "organization #1" directory is uniquely assigned to a specific film provider, and the "disc #1" directory is assigned to the BD-ROM that is supplied by the same film provider.

By assigning, in a directory assigned for a specific provider, subdirectories in one-to-one correspondence with BD-ROMs supplied from that specific provider, download data relating to each BD-ROM is stored separately in the respective subdirectories. Similarly to the BD-ROM contents shown in FIG. 2, each subdirectory contains PlayList information, Clip information, and an AV Clip.

<Local Storage Structure—Part 2: AV Clip>

FIG. 5B shows the AV Clip stored on the local storage 2. Similarly to the three AV Clips on the BD-ROM, the AV Clip on the hard disk is stored in three extents (AVClip #4.1/3, AVClip #4.2/3, and AVClip #4.3/3). With this arrangement, any of the AV Clip on the hard disk and the plurality of AV Clips interleaved on the BD-ROM can be selected for playback. The video image presented by the AV Clip stored on the local storage 2 is referred to as an "Angle D".

<Local Storage Structure—Part 3: Clip Information>

Figure 6:
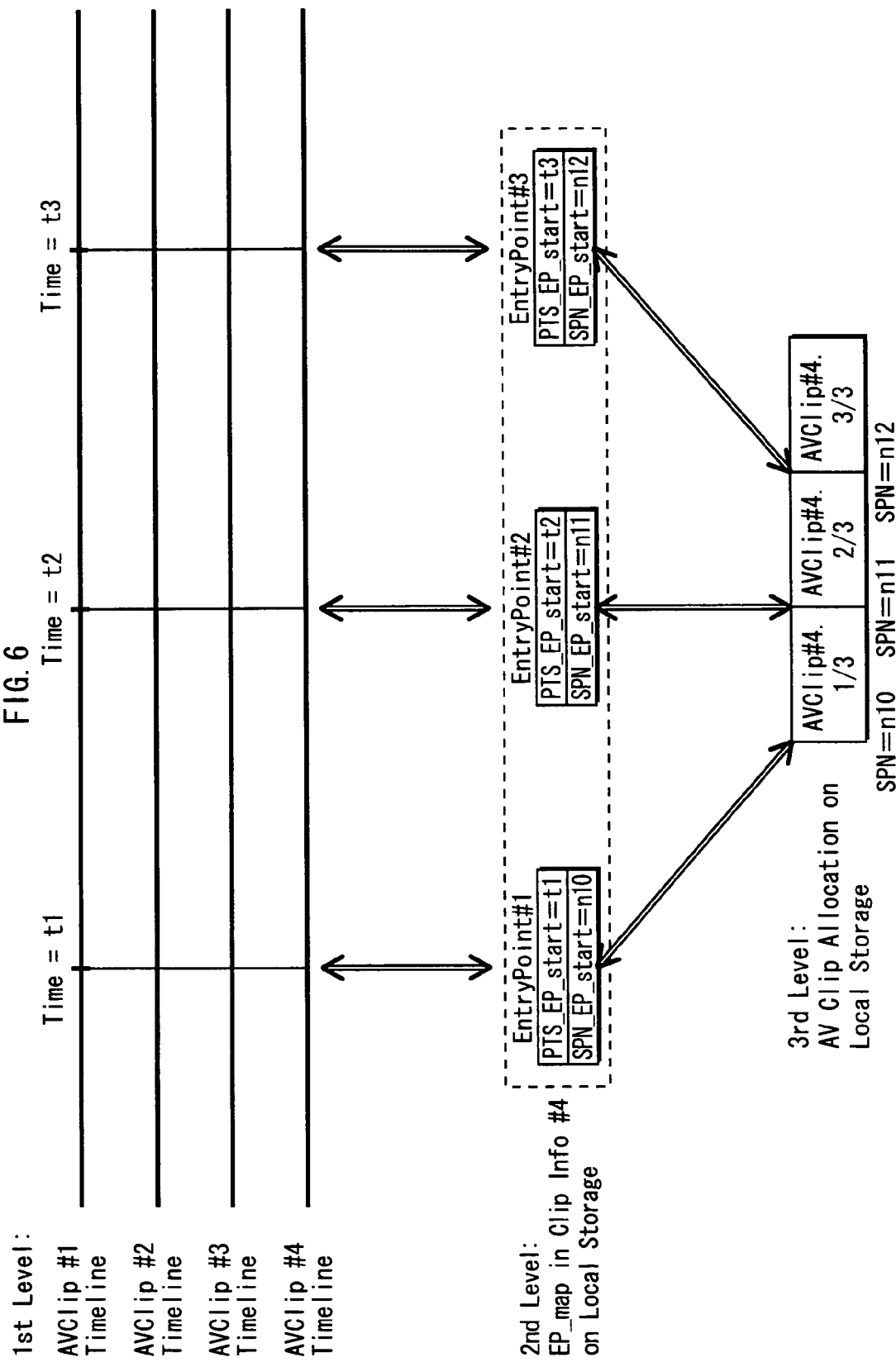
FIG. 6 shows the structure of EP_map contained in Clip-Info #4.

Similarly to Clip information stored on the BD-ROM, Clip information stored on the local storage 2 contains an EP_map. The EP_map shows the first SPNs of each AV Clip extent (AVClip #4.1/3, AVClip #4.2/3, and AVClip #4.3/3) together with their corresponding playback times. FIG. 6 shows the structure of EP_map contained in ClipInfo #4. In the figure, the $1^{st}$ level shows four timelines of the AVClip #1-AVClip #4. The $2^{nd}$ level shows the EP_map contained in ClipInfo #4. The $3^{rd}$ level shows the AV Clip stored on the local storage 2.

As shown on the $3^{rd}$ level, the AV Clip extents, namely AVClip #4.1/3, AVClip #4.2/3, AVClip #4.3/3 start with the packets bearing the packet numbers SPNs n10, n11, and n12, respectively. As shown on the $1^{st}$ level, the playback start times of the AV Clip extents AVClip #4.1/3, AVClip #4.2/3, AVClip #4.3/3 are t1, t2, and t3, respectively. That is, t1, t2, and t3 are common with the playback start times t1, t2, and t3 of AVClip #1.1/3-AVClip #3.1/3, AVClip #1.2/3-AVClip #3.2/3, and AVClip #1.3/3-AVClip #3.3/3. Thus, the EP_map contained in ClipInfo #4 indicates t1, t2, and t3 on the timelines of the AVClip #1-#4 together with SPNs n10, n11, and n12 of the AV Clips stored on the BD-ROM.

<Local Storage Structure—Part 4: PlayList Information>

Figure 7:
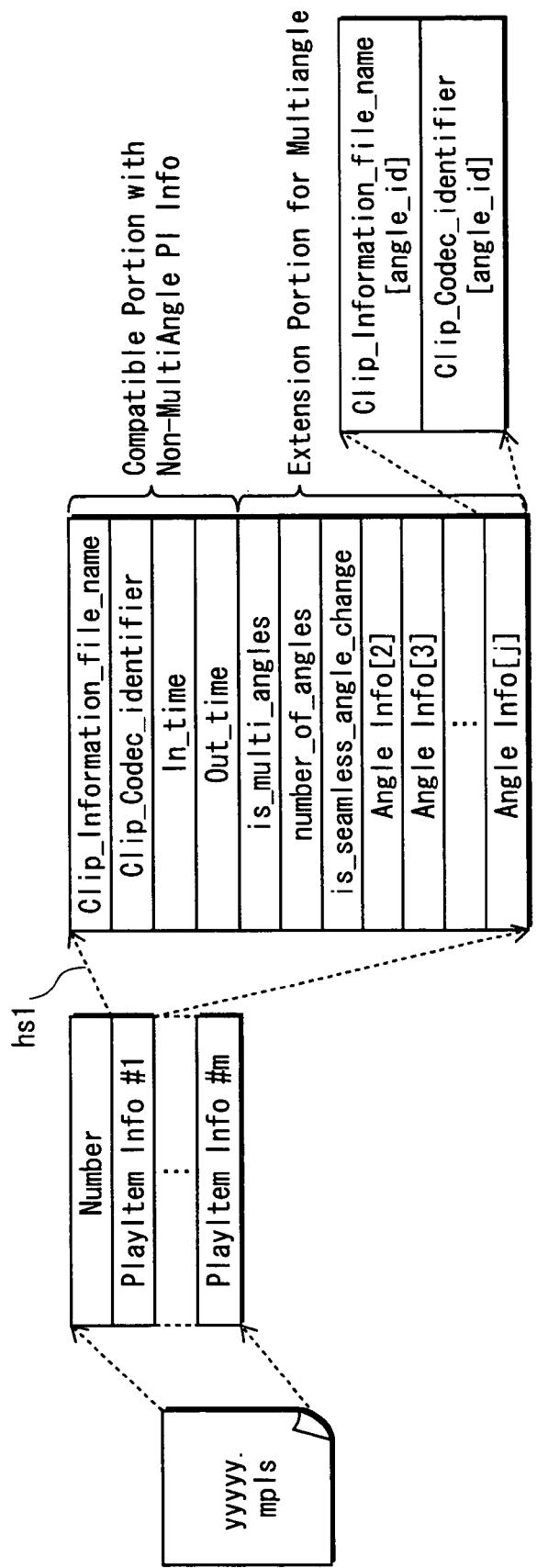
FIG. 7 shows the data structure of PlayList information.

PlayList information stored on the hard disk corresponds to the multiangle section. The PlayList information is structured so as to allow the plurality of AV Clips on the BD-ROM and the AV Clip on the hard disk to be selectively played. FIG. 7 shows the data structure of PlayList information on the hard disk. As shown in the figure, the PlayItem information corresponding to the multiangle section is composed of a portion compatible with a normal PlayItem and an extension portion for implementing the multiangle section. The data structure of the compatible portion is composed of the following fields: "Clip_Information_file_name", "Clip_codec_identifier", "IN_time", and "Out_time". Among the multiple AV Clips composing the multiangle section, the AV Clip specified in the compatible portion is handled as the first angle. With this arrangement, even if a playback apparatus not capable of multiangle playback (a playback apparatus only capable of playing a BD-RE data structure) reads the PlayItem corresponding to the multiangle section, the playback apparatus is still allowed to play back the first angle simply by referring to the compatible portion. The data structure of the extension portion is composed of the following fields: "is_multi_angle", "number_of_angles", "is_seamless_angle_change", and "Angle_info[2], [3] . . . , and [j]".

The "is_multi_angle" field indicates whether a playback section corresponding to the PlayItem is a multiangle section or non-multiangle section.

The "number_of_angles" field indicates, when the "is_multi_angle" field indicates a multiangle section, the number of angles composing the multiangle section.

The "is_seamless_angle_change" field indicates whether the angle change is meant to be seamless. Whether or not the angle change is seamless is determined depending on whether the AV Clips are interleaved or not. That is, in the case where the AV Clips are interleaved, the "is seamless_angle_change" field is set to ON. In the case where the AV Clips are not interleaved, the "is_seamless_angle_change" field is set to OFF.

Each of the "Angle_info[2], [3] . . . , and [j]" fields is information relating to a different one of the angles of the multiangle section, and contains "Clip_Information_file_name [angle_id]" and "Clip_codec_identifier[angle_id]" fields.

The "Clip_Information_file_name[angle_id]" field specifies the name of an AV Clip file used for the angle.

The "Clip_codec_identifier[angle_id]" field specifies the codec method of the AV Clip file specified by the "Clip_Information_file_name[angle_id]" field contained in the "Angle_info" field.

According to the above explanation, the "Angle_info" field does not contain the "In_time" and "Out_time" fields. This is because regarding each angle except the first angle, the start and end positions of the PlayItem is specified by the "In_time" and"Out_time" fields contained in the compatible portion. That is, the AV Clip specified by the "Clip_Information_file_name" field contained in each "Angle_info" field needs to have the same playback time with the AV Clip specified by the "Clip_Information_file_name" field contained in the compatible portion. In addition, on the playback timelines of the AV Clips, the timestamps defining playback timing of each AV Clip (System Time Clock) must have precisely the same value.

Since the compatible and extension portions of PlayItem information contain the "Clip_Information_file_name" fields, a playback section of the plurality of AV Clips can be specified all at once.

<Local Storage Structure—Part 5: Multiangle Section Specification>

FIG. 8A shows the collective specification of playback sections by the four "Clip_Information_file_name" fields contained in PlayItem Information. In the figure, the $1^{st}$ to $4^{th}$ levels show the timelines of the four AV Clips (the timelines of AVClip #1, #2, #3, and #4), and the $5^{th}$ level shows the timeline of PlayList information (PL timeline). The four "Clip_Information_file_name" fields contained in the PlayItem Information specify the timelines of the four AV Clips. Thus, one pair of "In_time" and "Out_time" fields contained in the PlayItem information defines four playback sections that can be selectively played. That is, there is defined on the PL timeline a multiangle section composed of multiple angles that can be changed. The four playback sections on the respective four AV Clips specified by the "In_time" and "Out_ time" fields are all located at the position corresponding to the same playback time on the PL timeline.

FIG. 8B shows extents of the respective AV Clips on the PL timeline. The three extents of each AV Clip are located at the positions corresponding to the same playback time with the counterpart extents of the other AV Clips. More specifically, AVClip #1.1/3, AVClip #2.1/3; AVClip #3.1/3, and AVClip #4.1/3 are all located at the same position on the PL timeline. Similarly, AVClip #1.2/3, AVClip #2.2/3, AVClip #3.2/3, and AVClip #4.2/3 are all located at the same position on the PL timeline, and AVClip #1.3/3, AVClip #2.3/3, AVClip #3.3/3, and AVClip #4.3/3 are all located at the same position on the PL timeline.

<VFS Management Unit 3>

The VFS management unit 3 constructs a virtual file system. The virtual file system is an expansion of the file system of BD-ROM achieved by adding new file information. The additional information mentioned herein is file management information relating to the PlayList information, the Clip information, and the AV Clip that are stored on the local storage 2. The VFS management unit 3 generates information defining the virtual file system to which such file management information is added, and passes the thus generated information to the control unit 11. This allows the control unit 11 to recognize that the PlayList information, the Clip information, and the AV Clip that are actually on the local storage 2 are stored on the BD-ROM.

Figure 9:
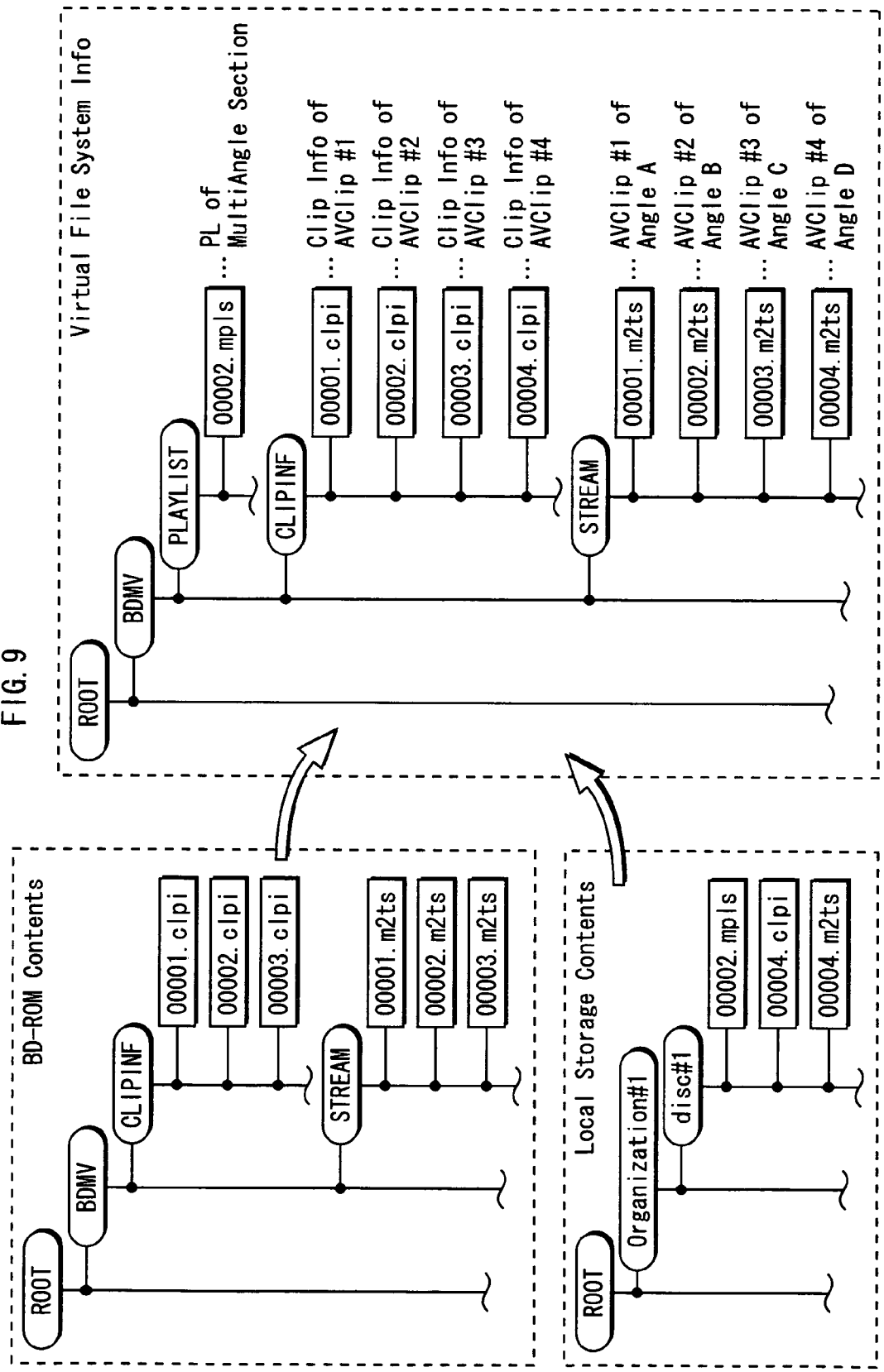
FIG. 9 shows an example in which a VFS management unit 3 constructs a virtual file system.

FIG. 9 shows one example in which the VFS management unit 3 constructs the virtual file system. Shown on the top left of the figure is the file structure of the BD-ROM directory, which is identical to what is shown in FIG. 2. Shown on the bottom left of the figure is the file structure of the local storage directory, which is identical to what is shown in FIG. 5A. The VFS management unit 3 incorporates, into the volume management information on the BD-ROM, file management information of the PlayList information, the Clip information, and the AV Clip stored on the local storage 2.

More specifically, the following processes are performed.

i) File management information of the PlayList (0002.mpls) file on the local storage 2 is added to the directory management information of the "mpls" directory contained in the BD volume structure information.

ii) File management information of the ClipInfo #4 (00004.clpi) on the local storage 2 is added to the directory management information of the "CLIPINF" directory contained in the BD volume structure information.

iii) File management information of the AV Clip #4 (00004.m2ts) on the local storage 2 is added to the directory management information of the "STREAM" directory contained in the BD volume structure information.

As a result, the virtual file system is implemented. The volume management information resulting from the addition is virtual file system information.

This concludes the explanation of the local storage 2. Now, the rest of components (from the switch 4 to the operation receiving unit 8) will be explained.

<Switch 4 to Operation Receiving Unit 8>

The switch 4 supplies an AV Clip read from either the BD-ROM drive 1 or from the local storage 2 to the video decoder 5.

The video decoder 5 decodes the AV Clip read from either the BD-ROM drive 1 or the local storage 2 and renders non-compressed picture data onto the video plane 6. The picture data rendered on the video plane 6 is converted into video signals and used for playback.

The scenario memory 7 is used to store Clip information and PlayList information.

When a user makes an operation on the remote controller, the operation receiving unit 8 receives from the remote controller a signal indicative of the received user operation. This concludes the explanation of the switch 4, the video decoder 5, the video plane 6, the scenario memory 7, and the operation receiving unit 8.

<PSR Set 9>

The PSR set 9 is a set of non-volatile registers provided within the playback apparatus and is composed of 64 Player Status Registers (PSR) and 4,096 General Purpose Registers (GSP). Among the PSRs, the values held in PSR4-PSR8 indicate the current playback position.

<Details of PSR Set—Part 1: PSRs Indicating Current Playback Position>

PSR(4) is set to a value from 1-100 and indicates a title to which the current playback position belongs.

PSR(5) is set to a value from 1-999 and indicates a chapter number to which the current playback position belongs. When set to the value "0xFFFF", PSR(5) indicates that the chapter numbers are invalid in the playback apparatus.

PSR(6) is set to a value from 0-999 and indicates a PL number to which the current playback position belongs (current PL No.).

PSR(7) is set to a value from 0-255 and indicates the PlayItem number to which the current playback position belongs (current PlayItem No.).

PSR(8) is set to a value from 0-0xFFFFFFFF and indicates the current playback position (current PTM (presentation time) in 45 kHz accuracy. By the PSR(4)-PSR(8), the current playback position is specified on the PL or AV Clip timeline.

<Details of PSR Set—Part 2: PSRs Indicating Selected Angle>

Among the PSR set 9, PSR(3) indicates a specification of an angle. PSR(3) stores a value indicating the current angle. The control unit 11 selects an angle in accordance with the value held in the PSR(3) and plays back the thus selected angle.

Figure 10:
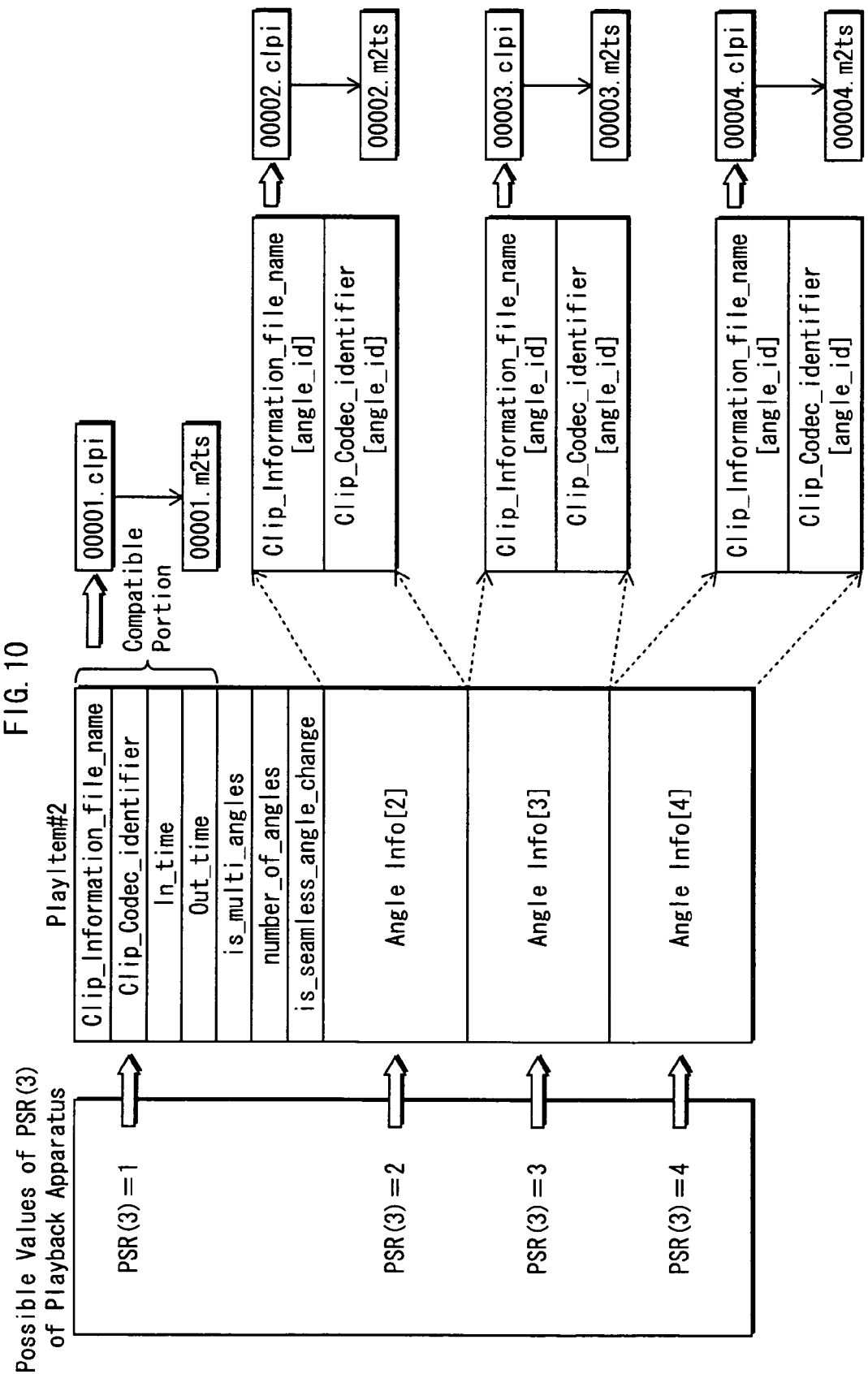
FIG. 10 shows a plurality of values PSR(3) may hold and their relations with PlayItem and Clip information.

FIG. 10 shows a plurality of values PSR(3) may hold and their relations with PlayItem and Clip information. The left part of the figure shows the values "1" to "4" that PSR(3) may hold.

In the case where PSR(3) is set to "1", the "Clip_information_file_name" field contained in the compatible portion of PlayItem information is referenced to. Since this field specifies the file name "00001.clip", Clip information having that file name is read to the memory. With reference to the EP_map contained in the read Clip information, the AV Clip (00001.m2ts) is played back.

In the case where PSR(3) is set to "2", the "Clip_information_file_name" field contained in the "Angle_info [2]" field in PlayItem information is referenced to. Since the "Clip_information_file_name" field specifies the file name "00002.clpi", Clip information having that file name is read to the memory. With reference to the EP_map contained in the read Clip information, AV Clip (00002.m2ts) is played back.

In the case where PSR(3) is set to "3", the "Clip_information file name" field contained in the "Angle_info [3]" field in PlayItem information is referenced to. Since the "Clip_information_file_name" field specifies the file name "00003.clpi", Clip information having that file name is read to the memory.

With reference to the EP_map contained in the read Clip information, AV Clip (00003.m2ts) is played back.

In the case where PSR(3) is set to "4", the "Clip_information_file_name" field contained in the "Angle_info [4]" field in PlayItem information is referenced to. Since the "Clip_information_file_name" field specifies the file name "00004.clpi", Clip information having that file name is read to the memory. With reference to the EP_map contained in the read Clip information, AV Clip (00004.m2ts) is referenced.

This concludes the explanation of the PSR set 9.

<Selecting Unit 10>

The selecting unit 10 selects one AV Clip from among multiple AV Clips specified in PlayItem information corresponding to the multiangle section, and causes the control unit 11 to play back the selected AV Clip. The selecting unit 10 makes the AV Clip selection in response to a status change of the playback apparatus or to a user operation requesting to change an angle number. In order to make the AV Clip selection, the selecting unit 10 first performs a predetermined procedure according to the BD-ROM standard, stores a new angle number into PSR(3), and causes the control unit 11 to play back the AV Clip specified by the angle number held in PSR(3), from among multiple AV Clips specified by "Clip_information_file_name" fields contained in the PlayItem information.

The "status change" of the playback apparatus mentioned above means a change from a piece of PlayItme information to a different piece of PlayItem information. The status change is readily detectable by monitoring the value of PSR (7) described above.

The predetermined procedure mentioned above means the following procedure. In response to a PlayItem change, the selecting unit 10 judges whether the current PlayItem includes an AV Clip corresponding to an angle number that is held in PSR(3) or requested by the user. Depending on the judgment result, the selecting unit 10 updates or maintains the value of PSR(3). More specifically, if it is judged that no corresponding AV Clip is present within the current PlayItem, a new value is stored into PSR(3). If it is judged that a corresponding AV Clip is present within the current PlayItem, the value of PSR(3) is maintained.

Upon a change of PlayItem information, the procedure described above is performed for the following reason. Each piece of PlayItem information differs in the number of AV Clips composing a multiangle section and whether the PlayItem information corresponds to a multiangle section. Thus, it is often the case where the playback apparatus is capable of playing an AV Clip corresponding to a specific angle number contained in a specific piece of PlayItem information, while the playback apparatus may not be capable of playing an AV Clip of the same angle number contained in a different piece of PlayItem information.

The procedure described above is performed also in response to a user operation. This is because an angle number stored into PSR(3) in accordance with the user operation may not be valid. When an invalid angle number is attempted to be stored, a recovery needs to be made.

<Control Unit 11>

The control unit 11 controls playback of AV Clips stored on the BD-Rom drive 1 and on the local storage 2. More specifically, with reference to the Clip information and the PlayList information, the control unit 11 causes the BD-ROM drive 1 or the local storage 2 to supply one of the AV Clips to the switch 4.

The control of AV Clip playback is carried out in the following manner. First, the control unit 10 opens an AV Clip file stored on the BD-ROM or on the hard disk, and converts the current PTM indicated by the value of PRS(8) to a sector number. The sector number indicates the relative number of sectors present between the top of the AV Clip file to the position corresponding to the current PTM. Then, the file pointer is set to the thus acquired relative sector number, and the AV Clip is read from the position indicated by the file pointer.

Under the playback control, the playback apparatus performs multiangle playback upon receipt of a signal indicative a request for an angle change from the remote controller. Multiangle playback is executed by a pair of operations of "exiting" from the currently reading AV Clip and "entering" into another AV Clip. To "exit" from an AV Clip is to move the optical pickup currently reading a TS packet of the AV Clip to outside the storage area where the AV Clip is stored.

To "enter" into an AV Clip is to move the optical pickup having exited from the previous AV Clip back to the storage area where a TS packet of another AV Clip is stored. Through the processes of "exiting" and "entering", the video images are dynamically switched during the AV Clip playback.

The AV Clips interleaved on the BD-ROM is divided into extents at boundaries residing on points of "entering" and "exiting". Thus, each extent begins at an entering point and ends at an exiting point. Since such extents of the different AV Clips are located in a cyclical sequence, the playback position can appropriately exit from one AV Clip and enter into another AV Clip. By appropriately "exiting" and "entering" AV Clips, an angle change is made seamlessly without interrupting the video playback.

<Details of Control Unit—Part 1: BD-ROM Playback>

FIG. 11A schematically shows the reading operation in the case where AVClip #1 on the BD-ROM is selected from among four angles. As shown in the figure, out of the extents composing the three AV Clips interleaved on the BD-ROM, the extents of the AV Clip #1 (AVClip #1.1/3, AVClip #1.2/3, and AVClip #1.3/3) are sequentially read.

FIG. 11B schematically shows the reading operation in the case where AVClip #2 on the BD-ROM is selected from among four angles. As shown in the figure, out of the extents composing three AV Clips interleaved on the BD-ROM, the extents of AVClip #2 (AVClip #2.1/3, AVClip #2.2/3, and AVClip #2.3/3) are sequentially read.

FIG. 12A schematically shows the reading operation in the case where AVClip #2 is selected during the playback of AVClip #1. In the figure, there is an arrow denoted as "change operation". This indicates the timing of change operation. In the example shown in the figure, a change operation from Angle A to Angle B is initiated during the playback of AVClip #1.1/3. Even if the change operation is initiated, AVClip #1.1/3 is continued to be read. After the entire AVClip #1.1/3 is read, the extent to be read next is not the second extent of AVClip #1 (AVClip #1.2/3) but the second extent of AVClip #2 (AVClip #2.2/3). Thus, subsequently to AVClip #1.1/3, the extents of AVClip #2 (AVClip #2.2/3, AVClip #2.3/3) are sequentially read.

<Details of Control Unit 11—Part 2: Angle Selection on BD-ROM>

FIG. 12B schematically shows the reading operation when AVClip #3 is selected during the playback of AVClip #1. In the figure, there is an arrow denoted as "change operation". This indicates the timing of change operation. In the example shown in the figure, a change operation from Angle A to Angle C is initiated during the playback of AVClip #1.1/3. Even if the change operation is initiated, AVClip #1.1/3 is continued to be read. After the entire AVClip #1.1/3 is read, the extent to be read next is not the second extent of AVClip #1 (AVClip #1.2/3) used for Angle A, but the second extent of AVClip #3 (AVClip #3.2/3) used for Angle C. Thus, subsequently to AVClip #1.1/3, the extents of AVClip #3 (AVClip #3.2/3, AVClip #3.3/3) used for Angle C are sequentially read. As described above, since the multiple AV Clips composing the multiangle section are interleaved on the BD-ROM, an angle change is seamlessly performed without interrupting the video playback even if it takes a relative long time to move the optical pickup. This concludes the explanation of the angle change of the AV Clips stored on the BD-ROM.

FIG. 13A schematically shows the reading operation performed when an angle change from AVClip #1 to AVClip #4 is initiated during the playback of AVClip #1.1/3. Similarly to the example shown in FIG. 12A, the example shown in FIG. 13A relates to the case where a change operation is initiated during the time AVClip #1.1/3 is being read. Even if the change operation is initiated, AVClip #1.1/3 is continued to be read. After the entire AVClip #1.1/3 is read, AVClip #4.2/3 and AVClip #4.3/3 stored on the local storage 2 are sequentially read.

FIG. 13B schematically shows the movement of the optical pickup during the time AVClip #4.2/3 and AVClip #4.3/3 are being read. FIGS. 14A and 14B schematically show the reading operation and the movement of the optical pickup performed to resume AVClip reading.

During the time AVClip #4.2/3 is being read, the BD-ROM drive is put to an idle state. Consequently, the drive device retracts the optical pickup into the lead-in area of the BD-ROM (FIG. 13B). With this being a situation, in the case where AVClip #1 is selected for playback during the playback of AVClip #4.2/3, the optical pickup needs to be moved back from the lead-in area to the storage area of the BD-ROM where AVClip #1.3/3 is stored. This causes an interruption before playback of the AV Clip stored on the BD-ROM begins. FIG. 14A schematically shows an example in which Angle A→Angle D→Angle A are sequentially selected. Similarly to the example shown in FIG. 13A, a change operation from Angle A to Angle D in the example shown in FIG. 14A is initiated during the time AVClip #1.1/3 is being read. In addition, a change operation from Angle D to Angle A is initiated during the time AVClip #4.2/3 is being read. FIG. 14B schematically shows the movement of the optical pickup from the lead-in area.

Moreover, even if no user operation for an angle change is made, after completing the reading of the multiangle section, the control unit 11 needs to resume playback of the non-multiangle section stored on the BD-ROM. Also in this case, the optical pickup needs to be moved from the lead-in area to the AV Clip storage area. According to prior art, it takes a while to resume reading. This duration of the time the optical pickup being moved may cause an interruption to the data supply to the decoder and thus cause an interruption to the video playback.

<Details of Control Unit—Part 3: Tracking Control of Optical Pickup>

In view of the above, according to the present embodiment, the optical pickup of the BD-ROM drive 1 is controlled to follow or track the movement of the pickup of the local storage 2.

Under the tracking control, during the time the playback apparatus is playing the AV Clip stored on the local storage 2, the optical pickup of the BD-ROM drive 1 is caused to access a position, in an AV Clip stored on the BD-ROM, corresponding to the current playback position in the AV Clip stored on the local storage 2. Under the tracking control, the optical pickup is caused at all times to access a position, in the AV clip storage area of the BD-ROM, corresponding to the current playback position in the AV Clip stored on the local storage 2. Thus, when the playback is switched from the AV Clip stored on the local storage 2 to an AV Clip stored on the BD-ROM, what is required is to move the optical pickup already accessing the interleaved area. In other words, there is no need for moving the optical pickup all the way from the innermost track to the interleaved area of the optical disc.

The tracking control of the optical pickup is carried out in the following manner. First, with reference to EP_map, the current PTM indicated by PSR(8) is converted into the sector number of an AV Clip file stored on the BD-ROM. Then, a file pointer of the BD-ROM drive 1 is set to indicate the thus converted sector number. Once the file pointer is set, the set value is updated with the update of the PTM indicated by PSR(8).

A file pointer indicating the current read position of the local storage 2 is updated with the update of PTM. Since the file pointer indicating the read position on the BD-ROM is also updated along with PTM, the file pointer of the BD-ROM follows the movement of the file pointer of the local storage 2.

Each extent composing the multiangle section contains a GOP at the top or in the middle thereof. EP_map shows the SPN of the first I-picture in each GOP together with the PTS of that I-picture. Thus, with reference to EP_map, it is possible to randomly access any playback position in the AV Clip stored on the BD-ROM. The tracking control is realized by converting PTM indicating the current playback position in the AV Clip stored on the local storage 2 into a corresponding position in the AV Clip stored on the BD-ROM, using the EP_map of the AV Clip stored on the BD-ROM.

FIG. 15A schematically shows the tracking control of the optical pickup performed by the control unit 11 in response to a user operation to change Angle A to Angle D.

In the figure, dashed arrows represent the tracking control of the optical pickup performed by the control unit 11. During the time AVClip #4.2/3 and AVClip #4.3/3 on the local storage 2 are being read as shown in the figure on the $2^{nd}$ level, the BD-ROM drive 1 is controlled so that the optical pickup points to AVClip #1.1/3 and AVClip #1.2/3 on the BD-ROM, as represented by the dashed allows.

More specifically, during the time AVClip #4.2/3 is being read from the local storage 2, the optical pickup of the BD-ROM drive 1 is caused to read AVClip #1.2/3. During the time AVClip #4.3/3 is being read from the local storage 2, the optical pickup of the BD-ROM drive 1 is caused to read AVClip #1.3/3. Consequently, the optical pickup of the BD-ROM drive 1 always points at the position, in the AV Clips stored on the BD-ROM, corresponding to the current playback position during the time the AV Clip stored on the local storage 2 is being read. Suppose, in the example shown in FIG. 15A, the non-multiangle section stored on the BD-ROM needs to be played after the playback of AV Clip #4.3/3 on the local storage 2. Since the optical pickup under the tracking control is always located within the interleaved area, playback of the non-multiangle section is instantly initiated. That is, when playback of an AV Clip on the BD-ROM is instructed upon completion of the playback of the AV Clip on the local storage 2, the AV Clip on the BD-ROM is timely supplied to the decoder without interruption.

FIG. 15B schematically shows the setting of the switch 4 at the time of the read operation shown in FIG. 15A. During the time AVClip #1.1/3 is being read, the switch 4 is switched to the BD-ROM, so that data to the video decoder 5 is supplied from the BD-ROM. During the time AVClip #4.2/3 and AVClip #4.3/3 are being read, the switch 4 is switched to the local storage 2, so that data to the video decoder is supplied from the local storage 2. As described above, the source of data supply to the video decoder 5 is appropriately switched. Thus, even if the optical pickup of the BD-ROM drive 1 accesses AVClip #1.2/3 and AVClip #1.3/3 during the time AVClip #4.2/3 and AVClip #4.3/3 are being read, the playback apparatus does not play back AVClip #1.2/3 and AVClip #1.3/3.

FIG. 16A schematically shows the tracking control of the optical pickup in the case where Angle A→Angle D→Angle A are sequentially selected. Similarly to the example shown in FIG. 15A, the tracking control is performed, so that the optical pickup accesses a position in AVClip #1.2/3 on the BD-ROM during the time the AV Clip on the local storage 2 is being read. Suppose an angle change from Angle D to Angle A is initiated during the playback of AVClip #4.2/3. At the time the angle change is initiated, the optical pickup of the BD-ROM drive 1 is already accessing AVClip #1.2/3. Thus, AVClip #1.3/3 that is physically subsequent to AVClip #1.2/3 is promptly read. Under the tracking control, the optical pickup of the BD-ROM drive 1 accesses the interleaved area of AV Clips on the BD-ROM at all times. Thus, the playback of the interleaved area on the BD-ROM is promptly resumed.

FIG. 16B schematically shows the setting of the switch 4 at the time of the read operation shown in FIG. 16A. During the time AVClip #1.1/3 and AVClip #1.3/3 are being read, the switch 4 is switched to the BD-ROM, so that data to the video decoder 5 is supplied from the BD-ROM. During the time AVClip #4.2/3 is being read, the switch 4 is switched to the local storage 2, so that data to the video decoder is supplied from the local storage 2. As described above, the source of data supply to the video decoder 5 is appropriately switched. Thus, even if the optical pickup of the BD-ROM drive 1 accesses AVClip #1.2/3 during the time AVClip #4.2/3 is being read, the playback apparatus does not play back AVClip #1.2/3.

Hereinafter, an explanation is given to software implementation of the control unit 11. The control unit 11 is implemented by a program causing a CPU of the playback apparatus to perform the processing steps of the flowchart shown in FIG. 17.

Figure 17:
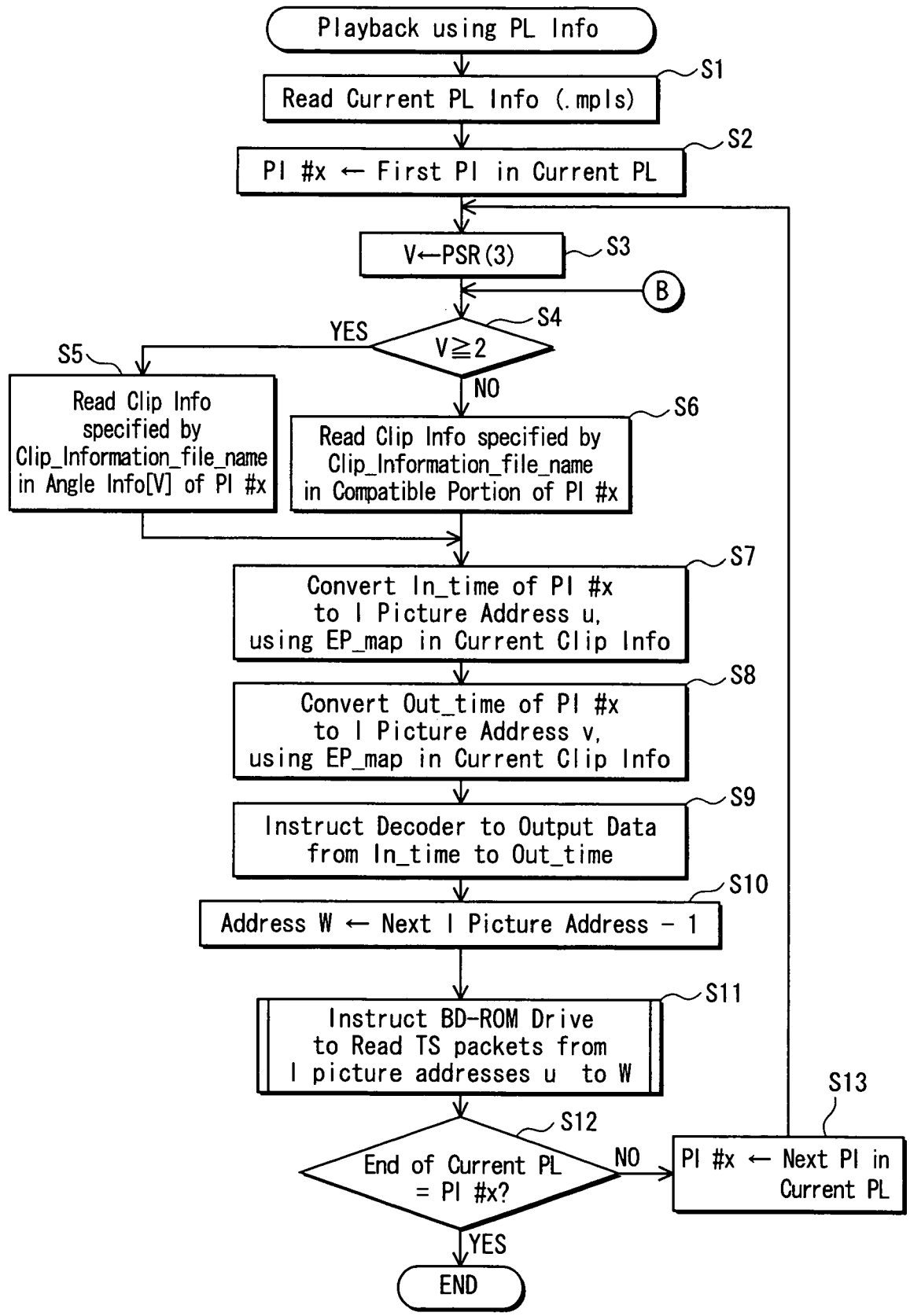
FIG. 17 is a flowchart showing steps of PL playback procedure performed by the control unit 11.

FIG. 17 is the flowchart showing the steps of playback procedure performed by the control unit 11. In the flowchart, PlayItem to be processed is referred to as "PlayItem #x". As shown in the flowchart, the current PlayList information (.mpls) is read (step S1), and the first PlayItem in the current PlayList is designated as PlayItem #x (PI #x). (step S2).

Next, steps S3-S13 are performed. The steps S3-S13 forms a loop that is repeated until the judgment in the step S12 results in "YES". Consequently, the steps S3-S13 are performed for each PlayItem in the current PlayList information.

In the steps S3-S13 repeated in the loop, the following processes are performed. When one of the PlayItems in the PlayList information is played back, the value held in PSR(3) is assigned to a variable V (step S3). Then, it is judged whether the valuable V is equal to or greater than "2" (step S4).

If the value of PSR(3) is equal to or greater than "2" (step S4: YES), Clip information specified by the "Clip_Information_file_name" field in Angle_info[V], which is the Vth piece of angle information, is read to the memory (step S5). The thus read Clip information is designated as the current Clip information.

In the case where the value V of PRS(3) is equal to "1" (step S4: NO), Clip information specified by the "Clip_information_file_name" field in the compatible portion of the Play- Item is read to the memory (step S6). The thus read Clip information is designated as the current Clip information.

Next, In_time of PlayItem #x is converted into the address u of I-picture, using the EP_map of the current Clip information (step S7). Similarly, Out_time of PlayItem #x is converted into the address v of I-picture, using the EP_map of the current Clip information (step S8). The control unit 11 then instructs the decoder to output part of PlayItem #x from In_time and Out_time (step S9).

Next, the control unit 11 calculates the address of I-picture subsequent to the address V acquired by the conversion in the step S8, and designates the address of I picture immediately preceding that I picture is designated as the address w (step S10). Then, the control unit 11 instructs the BD-ROM drive 1 to read TS packets from the I-picture addresses u and w (step S11). The loop is broken when PlayItem #x is the last PlayItem of the current PlayList (step S12). If PlayItem #x is not the last PlayItem, the next PlayItem in the current PlayList is designated as new PlayItem #x (step S13).

Figure 18:
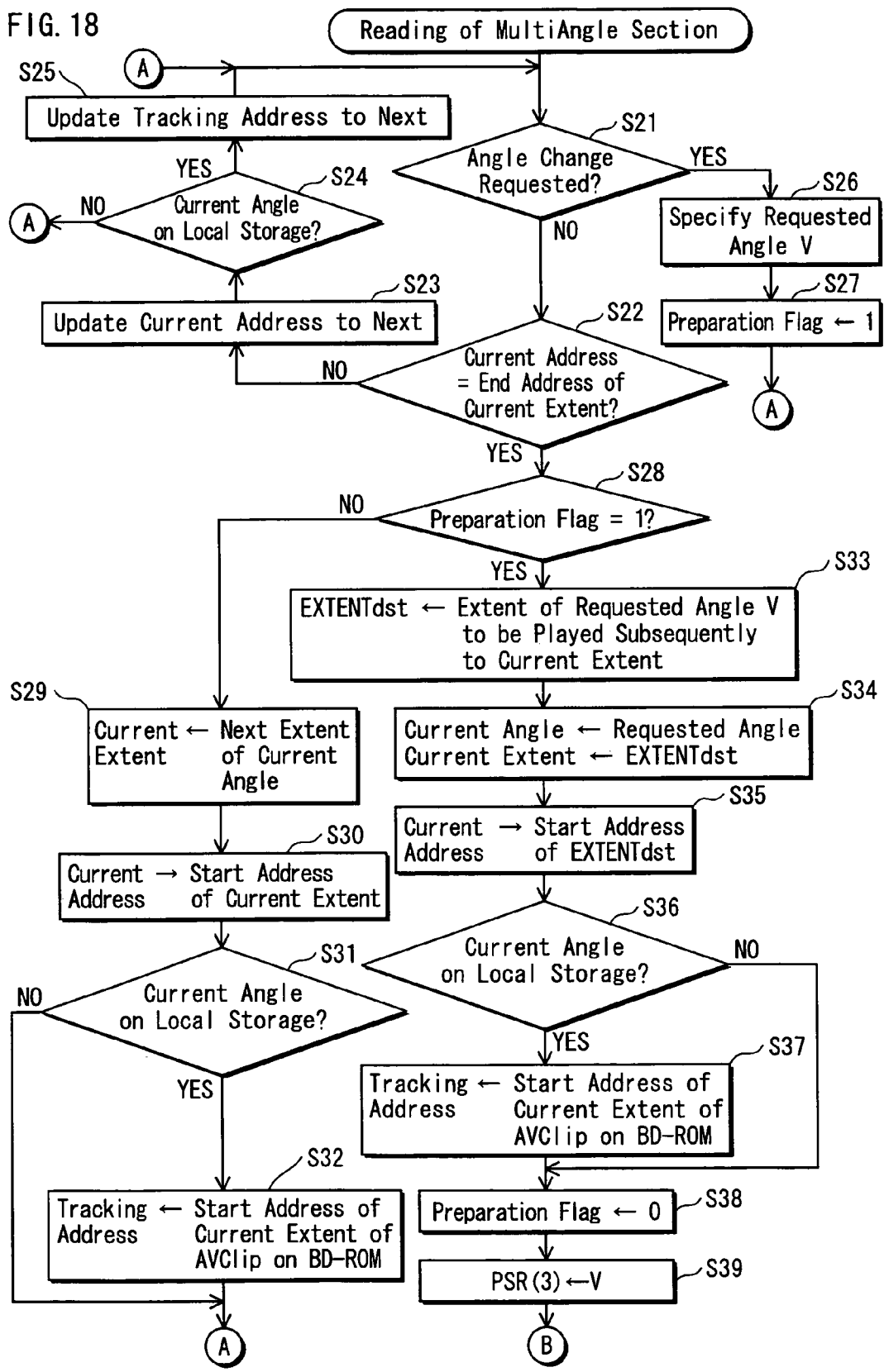
FIG. 18 is a flowchart showing the steps of reading a multiangle section.

FIG. 18 is a flowchart showing the steps of reading the multiangle section. In the flowchart, an extent to be read is specified by a current address and is designated as a current extent. In addition, among the multiple angles composing athe multiangle section, the angle currently used for playback is designated as a current angle. In addition, a preparation flag mentioned in the flowchart indicates whether an angle change is to be performed or not and is set to "0" by default.

The "current address" refers to a variable indicating a current read position in the AV Clip storage area. The current address may specify a position in the AV Clip storage area of the BD-ROM or of the local storage 2. That is, the current address is abstraction of the address of a position in the storage areas of the BD-ROM and the local storage 2. On the other hand, the "tracking address" refers to a variable that is valid only when the current address specifies a position in the storage area of the local storage 2. The tracking address specifies a position on the BD-ROM corresponding to the position on the local storage 2 that is specified by the current address. The tracking control of the optical pickup is realized by updating the "tracking address".

Steps S21-S25 form a main loop of the flowchart. The main loop is performed to update the current address to the next address (step S23) when the steps S21-S22 results in "YES".

In addition, it is judged whether the current address specifies a position in the AV Clip storage area of the local storage 2 (step S24). If the judgment results in "YES", the tracking address is updated (step S25).

By repeating the steps S20-S25, the current address specifying the read position is sequentially updated within one extent.

The current address is updated for each iteration of the main loop composed of the steps S21-S23. The tracking address, on the other hand, is updated when the current address is judged to specify a position in the AV Clip storage area of the local storage 2 (step S24: YES). That is, in the case where the current address specifies a position in the storage area of the BD-ROM, only the current address is updated for each iteration of the main loop. On the other hand, in the case where the current address specifies a position in the storage area of the local storage 2, both the current address and the tracking address are updated for each iteration of the main loop.

In the step S21, it is judged whether an angle change is requested. The angle change is requested at a push of an angle key or a numeric key on the remote controller by a user. If an angle change is requested, the value indicating the user-selected angle is assigned to the variable V (step S26), and the preparation flag is set to "1" (step S27).

Here, if the angle change is requested at a push of the angler key, the variable V is assigned a value acquired by adding "1" to the value held in PSR(3). On the other hand, if the angle change is requested at a push of a numeric button, the variable v is assigned a value associated with the pushed numeric key.

In the step S22, it is judged whether the current address is equal to the end address of the current extent. The step S22 results in "YES" when all the TS packets composing the current extent are read and thus the current address reaches the end of the current extent.

If the step S22 results in "YES", steps S28-S39 are preformed. In the step S28, it is judged whether the preparation flag is set to "1". If the preparation flag is set to "0", the next extent in the current AV Clip is designated as a new current extent (step S29), and the start address of the new current extent is designated as a new current address (step S30). After the designations, it is jugged whether the current angle is contained in the AV Clip on the local storage 2 (step S31). If the current angle is contained in the AV Clip on the local storage 2, the start address of a corresponding AV Clip extent on the BD-ROM is designated as a new tracking address (step S32). Through the above steps, the current address is updated to specify the start address of the next extent. In addition, in the case where the current angle is stored on the local storage 2, the tracking address is updated as well.

After the above steps, the processing returns to the loop composed of the steps S21-S25. That is, as long as the preparation flag is set to "0", the next extent of the current angle is read.

When the preparation flag is set to "1", the currently read AV Clip file is switched to another AV Clip file. This is because when the read address reaches the end of the current extent, it is triggered to switch the AV Clip file being read to another AV Clip file.

First, among the multiple extents composing the user-selected angle, the extent to be played subsequently to the current extent is designated as the extent dst (step S33) The user-selected angle is designated as a new current angle, and then the extent dst is designated as a new current extent (step S34). After the designations, it is judged whether the current angle is contained in the AV Clip on the local storage 2 (step S36). If the current angle is contained in the AV Clip on the local storage 2, a corresponding AV clip extent on the BD-ROM is designated as the tracking address (step S37).

Next, the preparation flag is cleared to "0" (step S38), and the variable V indicating the user-selected angle is stored into PSR(3) (step S39). Then, the processing returns to the step S21. Consequently, Clip information specified by the "Clip_information_file_name" field corresponding to the variable V is read, and the playback is continued based on the thus read Clip information.

As described above, the BD-ROM drive according to the present embodiment is controlled, so that the optical pickup is caused to point to the AV Clip interleaved area of the BD-ROM during the time the hard disk is being read. With this arrangement, when resuming playback of an AV Clip on the CD-ROM, no interruption is caused to the video playback.

Thus, multiangle playback is performed seamlessly and thus the users never recognize that the AV Clips are physically stored in separate storage locations such as the "BD-ROM" and "hard disk".

Second Embodiment

According to the first embodiment, the tracking control is performed, so that the optical pickup of the BD-ROM drive is caused to track a position on the BD-ROM according to the sequentially changing current playback position on the local storage 2. Yet, according to a second embodiment of the present invention, the tracking control is not performed. Instead, the optical pickup of the BD-ROM is caused to point at any position in the interleaved area. More specifically, the optical pickup is caused to point at any position in AVClip #1.1/3, AVClip #2.1/3, AVClip #3.1/3, AVClip #1.2/3, AVClip #2.2/3, AVClip #3.2/3, AVClip #1.3/3, AVClip #2.3/3, and AVClip #3.3/3. Since the optical pickup is caused to point at a position in the interleaved area, reading of an AV Clip stored on the BD-ROM is resumed immediately upon the reading of the AV Clip from the local storage 2 is completed. Thus, the read data is supplied to the decoder without interruption.

Up to this point, the present invention has been described by way of the above specific embodiments. Yet, those embodiments are cited merely as system examples with which the best effect is expected to be achieved in the state of the art. Various modifications may be made without departing from the gist of the present invention. Exemplary modifications include the following (A), (B), (C) . . . etc.

Supplemental Note

Needless to say, the foregoing explanations do not cover all the modes of practicing the present invention. The present invention can be practiced also by any of the following modifications (A), (B), (C), (D), . . . etc. It should be noted that the inventions recited in the claims of the present application are broadened or generalized descriptions of the above-described embodiments and their modifications. The extent of the broadening and generalization reflects the state of the art at the time of filing the present application.

(A) According to the above embodiments, the secondary recording medium, which means the local storage, is a hard disk. Yet, it is applicable to use any other recording media as the local storage. More specifically, the local storage may be any of the following: semiconductor memory cards, such as an SD memory card, a CompactFlash card, a SmartMedia card, a Memory Stick card, a MultiMediaCard, and a PCM-CIA card. Alternatively, the local storage may be any removable hard disk drive which is removable from the playback apparatus and portable. The examples include ORB, Jaz, SparQ, SyJet, EZFley, and Microdrive.

In addition, all the above embodiments employ a BD-ROM as the optical disc of the present invention. Yet, any recording medium of which access speed is relatively slow is applicable. Examples of such recording media include optical discs, such as a DVD-ROM, a DVD-RAM, a DVD-RW, a DVD-R, a DVD+RW, a DVD+R, a CD-R, and a CD-RW, and a magneto-optical disk, such as a PD or an MO.

(B) According to the above embodiments, each digital stream is an AV Clip compliant with the BD-ROM standard. However, the digital stream may be a VOB (Video Object) compliant with the DVD-Video standard or with the DVD-Video Recording standard. A VOB is a program stream compliant with the ISO/IEC 13818-1 standard, and is obtained by multiplexing a video stream and an audio stream. Alternatively, the video stream in an AV Clip may be compliant with the MPEG4 method or with the WMV method. Furthermore, an audio stream may be compliant with the Dolby-AC3 method, MP3 method, MPEG-AAC method, or dts method.

(C) The video stream in each of the above embodiments may be in any of the MPEG4-AVC format (also referred to as H.264 or JVT), the MPEG2 format, and the VC-1 format.

(D) Information processing using the functional components or the flowcharts explained in the above embodiments is actually realized using hardware resources. Accordingly, the information processing is said to be a highly advanced creation of technical ideas by which a low of nature is utilized, and thus satisfies the requirements of "program invention".

—Program Production According to the Present Invention—

A program according to the present invention may be produced in the following way. First, a software developer writes in a programming language a source program for implementing the flowcharts or the functional components explained above. When writing the source program for implementing the flowcharts or the functional components, the software developer may use class structures, variables, array variables, and calls for external functions, in accordance with the syntax of that programming language.

More specifically, for example, each loop shown in the flow chart maybe described using a FOR statement and each judgment may be described using an IF statement or a SWITCH statement, in accordance with the syntax. The hardware control including the playback control of the decoder and the access control of the drive device can be described using CALL statements for external functions provided by the hardware manufacturer.

After completion, the source program is supplied as a file to a compiler. The compiler translates the source program into an object program.

The compilation involves processes of parsing, optimization, resource allocation, and code generation. The parsing involves lexical analysis, syntactic analysis, and semantic analysis of the source program, and conversion of the source program into an intermediate program. The optimization involves processes of blocking the intermediate program into basic blocks, and control flow analysis and data flow analysis of the intermediate program. The resource allocation involves a process of allocating registers or memory of a target processor for variables appearing in the intermediate program in order to adapt the intermediate program to the instructions sets of the processor. The code generation involves a process of converting intermediate statements of the intermediate program into program code, whereby an object program is generated.

The thus generated object program is composed of one or more lines of code for causing a computer to perform steps shown in the flowcharts cited in the above embodiments or the procedures performed by the functional components. The program code mentioned herein maybe of any of a various types of codes including a native code of the processor and Java byte code. Each step may be implemented by the program code in various ways. For example, when a step is implemented using an external function, a CALL statement for the external function comprises a line of the program code. In addition, there may be a case where program code for implementing one step is contained in two or more separate object programs. When a RISC processor, which is designed for handling reduced instruction sets, is employed, each step of the flowcharts may be implemented using a combination of an arithmetic instruction, a logical instruction, and a branch instruction, for example.

Once the object program is generated, the programmer activates a linker. The linker allocates memory areas for the object program and related library programs, and binds them together to generate a load module. The thus generated load module is intended to be read by a computer thereby to cause the computer to perform the steps shown in the above flowcharts or the procedures performed by the functional components. Through the above processes, a program embodying the present invention is created.

(E) The program according to the present invention may be used in the following ways.

(i) As Embedded Program

When the program according to the present invention is used as an embedded program, a load module which is equivalent to the program is recorded into an instruction ROM along with a basic input output program (BIOS) and various pieces of middleware (operation systems). The instruction ROM is then built into the control unit and executed by the CPU. As a result, the program according to the present invention is used as the control program of the playback apparatus.

(ii) As Application Program

In the case where of a playback apparatus provided with an internal hard disk, a BIOS is already embedded within the instruction ROM and middleware (operation system) is pre-installed onto the hard disk. In addition, the playback apparatus is provided with a boot ROM for activating the system from the hard disk.

In this case, the load module is singly supplied via a portable recording medium or a network to the playback apparatus where the load module is installed as a single application program onto the hard disk. Then, the playback apparatus bootstraps to activate the operation system and instructs the CPU to perform the application program as a single application program, thereby using the program according to the present invention.

As described above, with a playback apparatus with an internal hard disk, the program according to the present invention can be used as a single application program. Thus, the program according to the present invention may be singly transferred, leased, or supplied over a network.

(F) A system LSI according to the present invention may be produced and used in the following ways.

Generally, a system LSI is composed of a bare chip packaged on a high-density substrate. In addition, a system LSI may be composed of a plurality of bare chips that is packaged on a high-density substrate and has an external structure just as a single LSI (this type system LSI is referred to as a multichip module).

Focusing on types of packaging, system LSIs includes QFP (quad flat package) and PGA (Pin Grid Array). QFP is a type of system LSI with pins extending from all four sides of the package. PGA is a type of system LSI package with an array of pins that are arranged on entire surface of the base of the package.

The pins act as an I/O interface with a drive device, a remote controller, and a television. The pins also act as an IEEE1394 interface and a PCI bus interface. Since the pins of the system LSI act as such an interface, by connecting circuitry of a drive device or a playback apparatus, the system LSI serves as the core of the playback apparatus.

A bare chip packaged into a system LSI may be an instruction ROM, CPU, a decoder LSI implementing the components shown in the figures of the internal structures according to the above embodiments.

As mentioned in the explanation of the use "As Embedded Program", the instruction ROM stores a load module equivalent to the program of the present invention, a BIOS, various pieces of middleware (operation systems). The part to which the above embodiments are particularly relevant is the load module equivalent to the program. Thus, by packaging, as a bare chip, the instruction ROM storing the load module equivalent to the program, a system LSI according to the present invention is produced.

The details of the production procedure are as follows. First step is to make a circuit diagram of apart to be incorporated into a system LSI, based on the figures showing the internal structures according to the above embodiments.

The next step for implementing each component is to design a bus connecting circuit elements, IC, and LSI, the peripheral circuitry, and interfaces with external devices. In addition, connecting lines, power lines, ground lines, clock signal lines are designed. In this process, operation timing of each component is adjusted in consideration of the LSI spec. In addition, some adjustment is made to ensure the bandwidth of each component. In this way, the circuit diagram is completed.

Once the circuit diagram is ready, the packaging design must be made. The packaging design is a process of designing a layout on a substrate, involving determining the physical arrangement of the elements (circuit elements, IC, and LSI) shown in the circuit diagram and also determining the wiring on the substrate.

The packaging design mentioned herein involves processes of auto layout and auto wiring.

When a CAD apparatus is employed, the auto layout is carried out using a dedicated algorithm called "centroid method". In the process of auto wiring, the connecting lines between the elements and pins shown on the circuit diagram are implemented using metal foil and vias. With a CAD apparatus, the wiring is completed using any of dedicated algorithms called "maze routing algorithm" and "line-search algorithm".

After the packaging design is completed and the layout on the substrate is determined, the related data is converted into CAM data and supplied to appropriate devices such as an NC machine tool. The NC machine tool incorporates the elements using System on Chip (SoC) or System in Package (SiP) implementations. According to the SoC implementation, multiple circuits are baked on a single chip. According to the Sip implementation, multiple chips are joined into a single package with resin, for example. Through the above processes, a system LSI according to the present invention can be produced, based on the figures showing the internal structure of the playback apparatus cited in the above embodiments.

Note that integrated circuits produced in the above manner may be referred to as IC, LSI, super LSI, or ultra LSI, depending on the packaging density.

In addition, it is applicable to incorporate all or some of the components of each playback apparatus into a single chip. In addition, instead of the SoC and SiP implementations, the elements may be integrated using a dedicated circuit or a general purpose process. It is also applicable to use reconfigurable processor of which the connection between circuit cells within the LSI and their settings can be restructured. When any new circuit integration technology becomes available or derived as the semiconductor technology advances, such new technology may be employed to integrate the functional blocks of the present invention. One possible candidate of such new technology may be achieved by adapting biotechnology.

(F) It should be noted that the tracking control of the BD-ROM drive may be carried out without using EP_map. The tracking control may be carried out by analyzing the PTS values of PES packets composing an AV Clip stored on the BD-ROM to locate a position on the BD-ROM corresponding to the current playback position on the local storage 2.

(G) According to the above embodiments, the current read position on the local storage 2 is indicated by PTM. Yet, in the case where the AV Clip is allocated a constant bit rate (CBR), the read position on the local storage 2 may be expressed using an address. In this case, the tracking control is performed by causing the optical pickup of the BD-ROM drive 1 to access a position having the same address on the BD-ROM. In addition, in the case where the bit rate allocated to the AV Clip on the local storage 2 is proportional to the bit rate allocated to the AVClips on the BD-ROM, the read position may also be expressed using an address.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback apparatus for selectively playing back a plurality of video streams stored on a plurality of recording media, comprising:
   a plurality of drive devices, each operable to access a different one of the recording media;
   a selecting unit operable to select one of the video streams in accordance with a user operation or a state of the playback apparatus;
   a control unit operable to control the drive devices, so that the selected video stream is read from one of the recording media; and
   a playback unit operable to play the read video stream, wherein
   one of the recording media is an optical disc, and another of the recording media is a secondary medium used as an additional medium to the optical disc, and
   when the video stream to be read is switched from the video stream stored on the optional disc to the video stream stored on the secondary medium, the control unit causes an optical pickup of an optical disc drive device to point to an area on the optical disc where the video stream is stored, despite that the video stream stored on the optical disc is not played, wherein
   the optical pickup is caused to point at a position in the area on the optical disc where the video stream is stored, the position corresponding to a current read position in the digital stream stored on the secondary medium.

2. The playback apparatus according to claim 1, wherein the control unit causes the optical pickup to track a position on the optical disc corresponding to the current read position in the video stream stored on the secondary medium.

3. The playback apparatus according to claim 2, wherein read positions on the secondary storage medium are indicated by time information, and
   the tracking control by the control unit is carried out by converting the time information indicating the current read position to an address on the optical disc and causing the optical pickup to access the address.

4. The playback apparatus according to claim 2, wherein read positions on the secondary storage medium are indicated by addresses, and
   the tracking control by the control unit is carried out by causing the optical pickup to access a position on the optical disc having a same address as an address of the current read position on the secondary medium.

5. The playback apparatus according to claim 1, wherein the plurality of video streams stored on the plurality of recording media is a plurality of video streams composing multiangle video images, and
   the selective playback of the plurality of video streams provides an angle change presentation.

6. A method for use by a playback apparatus to selectively play back a plurality of video streams stored on a plurality of recording media, said method comprising:
   a selecting step of selecting one of the video streams in accordance with a user operation or a state of the playback apparatus;
   a control step of controlling a plurality of drive devices each operable to access a different one of the recording media, so that the selected video stream is read from one of the recording media; and
   a playback step of playing the read digital stream, wherein
   one of the recording media is an optical disc, and another of the recording media is a secondary medium used as an additional medium to the optical disc, and
   in the control step, when the video stream to be read is switched from the video stream stored on the optical disc to the video stream stored on the secondary medium, an optical pickup of an optical disc drive device is caused to point to an area on the optical disc where the video stream is stored, despite that the video stream stored on the optical disc is not played, wherein
   the optical pickup is caused to point at a position in the area on the optical disc where the video stream is stored, the position corresponding to a current read position in the video stream stored on the secondary medium.

* * * * *

UNITED STATES PATENT AND TRADEMARK OFFICE
CERTIFICATE OF CORRECTION

| | |
|---|---|
| PATENT NO. | : 7,609,947 B2 |
| APPLICATION NO. | : 11/216409 |
| DATED | : October 27, 2009 |
| INVENTOR(S) | : Ikeda et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Twelfth Day of October, 2010

David J. Kappos
*Director of the United States Patent and Trademark Office*